United States Patent
Yates et al.

(10) Patent No.: US 12,488,050 B2
(45) Date of Patent: Dec. 2, 2025

(54) USING GENERATIVE AI MODELS FOR CONTENT SEARCHING AND GENERATION OF CONFABULATED SEARCH RESULTS

(71) Applicant: Dropbox, Inc., San Francisco, CA (US)

(72) Inventors: Andrew Donald Yates, San Francisco, CA (US); Yash Narayan, San Carlos, CA (US); Darrow Hartman, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/921,838

(22) Filed: Oct. 21, 2024

(65) Prior Publication Data

US 2025/0131042 A1    Apr. 24, 2025

Related U.S. Application Data

(60) Provisional application No. 63/612,634, filed on Dec. 20, 2023, provisional application No. 63/545,035, filed on Oct. 20, 2023.

(51) Int. Cl.
   *G06F 16/9032*   (2019.01)
   *G06Q 30/0601*   (2023.01)

(52) U.S. Cl.
   CPC ... *G06F 16/90324* (2019.01); *G06Q 30/0641* (2013.01)

(58) Field of Classification Search
   None
   See application file for complete search history.

(56) References Cited

U.S. PATENT DOCUMENTS

| | | | |
|---|---|---|---|
| 10,102,559 | B1 | 10/2018 | Jain et al. |
| 10,891,676 | B1 | 1/2021 | Kan et al. |
| 2005/0065959 | A1 | 3/2005 | Smith et al. |
| 2007/0192300 | A1 | 8/2007 | Reuther et al. |
| 2011/0191327 | A1 | 8/2011 | Lee |
| 2014/0101147 | A1 | 4/2014 | Foody |
| 2015/0046281 | A1 | 2/2015 | Shivaswamy et al. |
| 2016/0004695 | A1 | 1/2016 | Yang et al. |
| 2017/0357717 | A1 | 12/2017 | Hughes et al. |
| 2018/0025003 | A1 | 1/2018 | Marriott et al. |
| 2018/0121047 | A1 | 5/2018 | Goel et al. |
| 2020/0097303 | A1 | 3/2020 | O'Kane et al. |
| 2020/0104305 | A1 | 4/2020 | Wei et al. |

(Continued)

OTHER PUBLICATIONS

Non-Final Office Action from U.S. Appl. No. 18/941,657, mailed on Jun. 18, 2025, 15 pages.

(Continued)

*Primary Examiner* — Taelor Kim
(74) *Attorney, Agent, or Firm* — Keller Preece PLLC

(57) ABSTRACT

Methods and systems provide content searching and retrieval using generative artificial intelligence (AI) Models. The system is configured to receive a user search for content, media or item listings. The user search is provided to a generative AI based search sub-system and to a traditional search sub-system. A first search result listing is generated by the generative AI based subsystem, and a second search result listing is generated by the traditional search sub-system. The first search result listing and the second search result listing are aggregated together and provided for display to a user client device.

20 Claims, 10 Drawing Sheets

(56) References Cited

U.S. PATENT DOCUMENTS

| | | | |
|---|---|---|---|
| 2020/0242144 A1 | 7/2020 | Yoshida et al. | |
| 2021/0049664 A1 | 2/2021 | Lundgaard et al. | |
| 2021/0334886 A1 | 10/2021 | Clark et al. | |
| 2021/0382952 A1 | 12/2021 | Yates | |
| 2023/0289868 A1 | 9/2023 | Bender et al. | |
| 2023/0316006 A1* | 10/2023 | Tunstall-Pedoe | G06N 3/0442 |
| | | | 704/9 |
| 2024/0096051 A1* | 3/2024 | Gopalakrishna | G06V 10/74 |
| 2024/0232199 A1 | 7/2024 | Hambardzumyan et al. | |
| 2024/0256582 A1 | 8/2024 | Jain et al. | |
| 2024/0256622 A1 | 8/2024 | Abrams et al. | |
| 2024/0289407 A1* | 8/2024 | Rofouei | G06F 16/9577 |
| 2024/0340487 A1 | 10/2024 | Ullah et al. | |
| 2024/0394512 A1* | 11/2024 | Cunningham | H04L 51/02 |
| 2024/0403373 A1 | 12/2024 | Chao et al. | |

OTHER PUBLICATIONS

Pierce, David. "The AI takeover of Google Search starts now." May 10, 2023. 13 pages. https://www.theverge.com/2023/5/10/23717120/google-search-ai-results-generated-experience-io (Year: 2023).

* cited by examiner

USING GENERATIVE AI MODELS FOR CONTENT SEARCHING AND GENERATION OF CONFABULATED SEARCH RESULTS

CROSS-REFERENCE TO RELATED APPLICATIONS

This application claims the benefit of priority to U.S. Provisional Application No. 63/612,634, filed on Dec. 20, 2023, and U.S. Provisional Application No. 63/545,035, filed on Oct. 20, 2023, which are hereby incorporated by reference in their entirety.

FIELD OF INVENTION

Various embodiments relate generally to content searching and retrieval, and more particularly, to systems and methods for content searching and retrieval using generative artificial intelligence (AI) models to generate confabulated search results.

SUMMARY

Methods, systems, and apparatus, including computer programs encoded on computer storage media relate to a method for content searching and retrieving using generative AI models. The system performs semantic searching using pre-trained "foundational" generative AI models and domain-specific generative AI models that are refinements of the "foundational generative AI" models.

Rather than using the query's content embedding to retrieve item embeddings, the system uses the embeddings of query-representative items to retrieve items. Traditionally, this technique used human-reviewed items or "historically good" items based on user feedback to map representative items to queries. In contrast, the system as described herein, representative items leverage the "hallucination" feature of generative AI models to first confabulate items that could answer the query and then cast these confabulations to embeddings. This allows the system to retrieve "like-to-like" similarity in a vector database for different media types (such as text, images, video, etc.). Moreover, the system may track or record the reason "why" certain items were selected as "relevant" in a human-intelligible way for debugging and anticipated AI act regulation.

One aspect of the system is focused around addressing the slow speed and expense of generating media in a live production system that, otherwise, should be cheap and fast in processing speed and retrieval of relevant content or media. Other aspects of the system include retrieving items based on the "meaning" of the query rather than simply matching keywords or similar keywords.

In some embodiments, methods and systems provide content searching and retrieval using generative artificial intelligence (AI) Models. The system is configured to receive a user search for content. The user search is provided to a generative AI based search sub-system and to a traditional search sub-system. A first search result listing is generated by the generative AI based subsystem, and a second search result listing is generated by the traditional search sub-system. The first search result listing and the second search result listing are aggregated together and provided for display to a user client device.

The examples and appended claims may serve as a summary of this application.

BRIEF DESCRIPTION OF THE DRAWINGS

The present invention relates generally to content generation, and more particularly, to systems and methods for providing rich media presentation of recommendations in generative media.

The present disclosure will become better understood from the detailed description and the drawings, wherein.

DETAILED DESCRIPTION

Figure 1A:
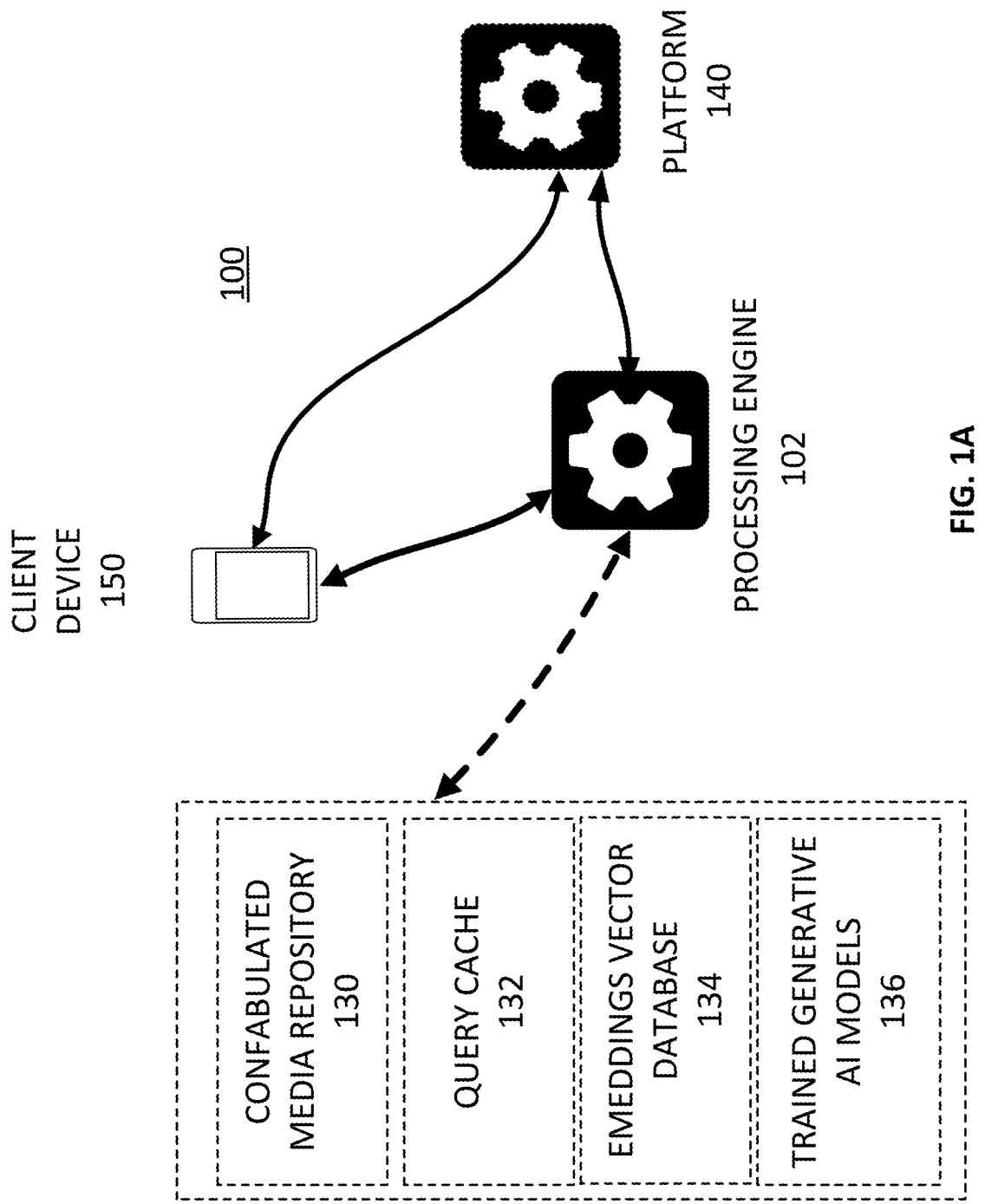
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150, and a platform 140 are connected to a processing engine 102. The processing engine 102 is optionally connected to one or more repositories and/or databases. Such repositories and/or databases may include, for example, a confabulated media repository 130, a query cache 132, embeddings vector database 134, and trained generative AI models 136, such as one or more foundation generative AI models and domain refined generative AI models. One or more of such repositories may be combined or split into multiple repositories. The client device 150 in this environment may be a computer, and the platform 140 and processing engine 102 may be, in whole or in part, applications or software hosted on a computer or multiple computers which are communicatively coupled via remote server or locally. In some embodiments, the embeddings vector database 134 includes at least one or more of the following: query embeddings which are historic embeddings associated with a prior user query; confabulated embeddings generated by the trained generative AI models; real product item listing embeddings; real document embeddings. Each of the embeddings in Vector database 134 may have a embedding type such as an image, text, multiple, etc.

The exemplary environment 100 is illustrated with only one client device, one processing engine, and one platform, though in practice there may be more or fewer additional client devices, processing engines, and/or platforms. In some embodiments, the client device, processing engine, and/or platform may be part of the same computer or device.

In an embodiment, the processing engine 102 may perform the method 200 (FIG. 2) or other method herein and, as a result, provide for rich media presentation of recommendations in generative media. In some embodiments, this may be accomplished via communication with the client device, additional client device(s), processing engine 102, platform 140, and/or other device(s) over a network between the device(s) and an application server or some other network server. In some embodiments, one or both of the processing engine 102 and platform 140 may be an application, browser extension, or other piece of software hosted on a computer or similar device, or in itself a computer or similar device configured to host an application, browser extension, or other piece of software to perform some of the methods and embodiments herein.

In some embodiments, the processing engine 102 performs processing tasks partially or entirely on the client device 102 in a manner that is local to the device and relies on the device's local processor and capabilities. In some embodiments, the processing engine 102 may perform processing tasks in a manner such that some specific processing tasks are performed locally, such as, user interface processing tasks, while other processing tasks are performed remotely via one or more connected servers, such as, media or content search and retrieval tasks. In yet other embodiments, the processing engine 102 may processing tasks entirely remotely.

In some embodiments, client device 150 may be a device with a display configured to present information to a user of the device. In some embodiments, the client device 150 presents information in the form of a user interface (UI) with UI elements or components. In some embodiments, the client device 150 sends and receives signals and/or information to the processing engine 102 pertaining to the platform. In some embodiments, client device 150 is a computer device capable of hosting and executing one or more applications or other programs capable of sending and/or receiving information. In some embodiments, the client device 150 may be a computer desktop or laptop, mobile phone, virtual assistant, virtual reality or augmented reality device, wearable, or any other suitable device capable of sending and receiving information. In some embodiments, the processing engine 102 and/or platform 140 may be hosted in whole or in part as an application or web service executed on the client device 150. In some embodiments, one or more of the platform 140, processing engine 102, and client device 150 may be the same device. In some embodiments, the platform 140 and/or the client device 150 are associated with one or more particular user accounts.

Figure 1B:
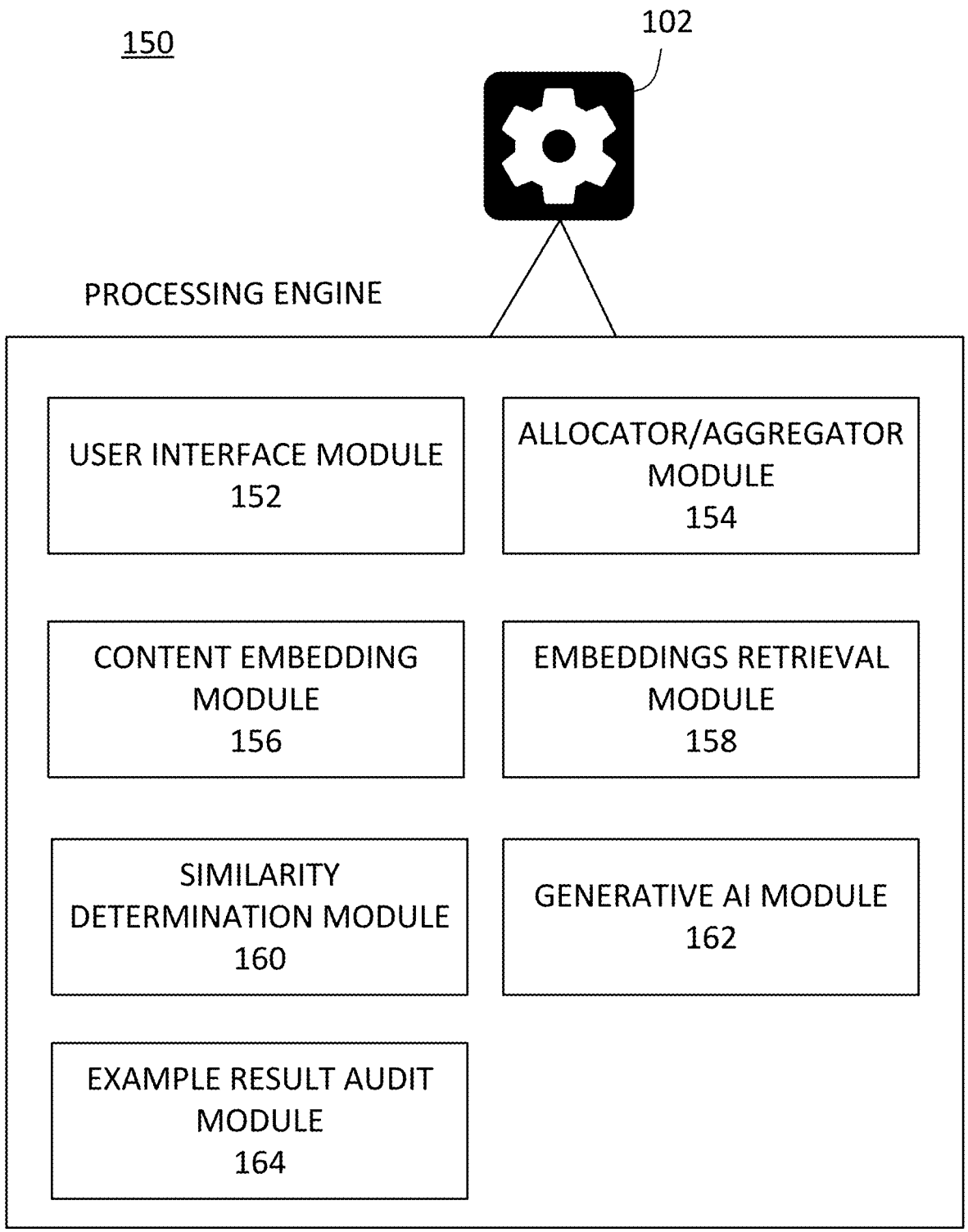
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to receive a user input of a search query and display the results of the search query via a user interface of the client device.

The allocator/aggregator module 154 functions to aggregate and search results from the traditional search and retrieval subsystem and the generative AI subsystem.

The content embedding module 156 obtains information about real listing of items, such as images, text and/or multimedia, and generates embeddings and stores the information in a vector database.

The embeddings retrieval module 158 obtains embedding information based on an identifier, such as an item identifier, a user identifier, a query identifier or a combination thereof.

The similarity determination module 160 determines a similarity and generates a similarity score based on a type and an identifier. The system searches a vector database that has stored embedding information related to text, images and multimedia. The module determines similarity of one or more embeddings of the confabulated listings generated from the one or more generative AI models with one or more embeddings for real product items, real documents or other embeddings stored in the vector database.

The generative AI module 162 receives a search query via a prompter to perform a search via one or more generative AI models. The generative AI models may include a primary general generative AI model and one or more domain specific generative AI models.

The example result audit module 164 evaluates an actual result of the generative AI model output and/or a user generated example of a good search results. The module 164 determines whether the search result is in compliance to one or more rules about the use of demographics or other factors.

Figure 2:
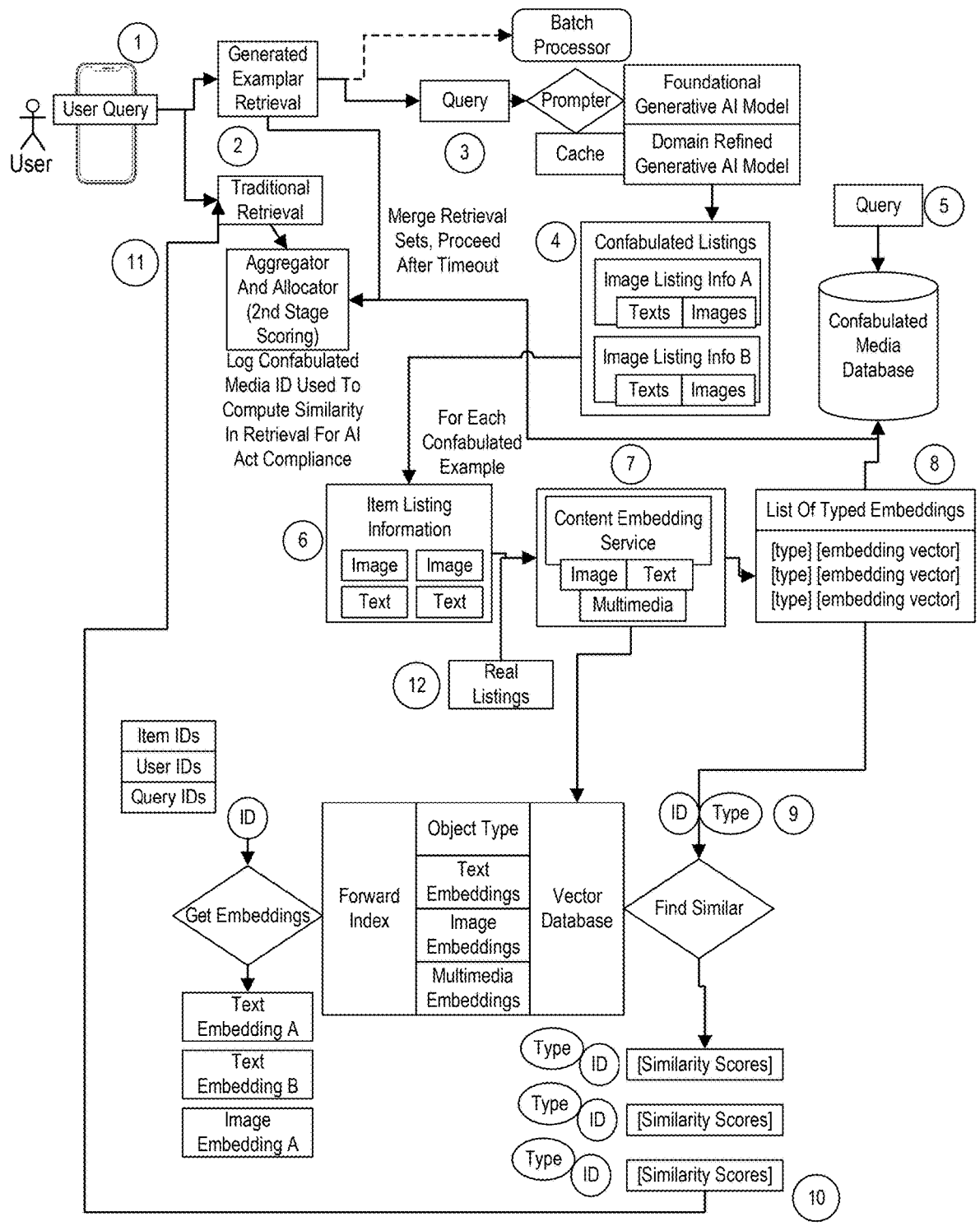
FIG. 2 is a diagram illustrating an exemplary method using an exemplary computer system.

The functionality of the above modules will be described in further detail with respect to the exemplary method of FIG. 2. FIG. 2 is a diagram illustrating an exemplary method using an exemplary computer system. The general system processing may be understood with respect to the figure. A user desires to search for relevant content or media items responsive to a search query. At reference 1, the user enters the search query via a user interface of a client device (such as text input responsive to a prompt). For example, the search query could be a traditional text search query or a query that includes additional metadata (such as search filters, context and/or past user history.) Moreover, the search query may be an abstract type of query such as listing user preference and selection criteria for use in a recommendation system. The system generates or assembles a modified query based on the user input and the additional of the additional metadata and/or context information. The modified query is subsequently processed by the system.

The modified query is further processed for parallel search and discovery by two different services or sub-systems. The first service or sub-system is a generative AI sub-system, and the second service or sub-system is a traditional retrieval system. Each of these sub-systems may receive the modified query and execute a search for a content or media responsive to the modified query. While the system is described using both sub-systems, in some embodiments the system may use only either the traditional retrieval subsystem or the generative AI model based sub-system.

In some embodiments, if either sub-system is too slow in terms of responsiveness to the search request, then retrieval results for the higher performing sub-system would be used. For example, if the generative AI sub-system is too slow (such as a delay for a period of time, for example 100 ms), then the retrieval results from the traditional retrieval system would be used.

At reference 3, the modified query is sent to a trained generative AI model for input via a prompter. The trained generative AI model generates one or more confabulated listings in response to the modified query. In some instances, the trained generative AI Model may be publicly trained and may include additional training to prioritize generations relevant to the application domain using standard generative AI task refinement techniques. In some cases, generation may be lengthy, and a generation may be batched for further processing for those most frequent or repeated queries for the day or for some other period of time. The system may employ multiple generative AI models with a primary (e.g., a foundational model) generative AI model for receiving the modified query via the prompter, and secondary (e.g., a domain refined generative AI model) one or more models. The second one or more models may receive output from the primary generative AI model. This configuration provides a fast initial search for the modified query, then with a more specific search using the output from the primary generative AI model to the one or more specifically trained domain specific models.

The system may perform an additional process of selecting a diverse set of exemplars from some measure of dissimilarity for a set of generated candidates. For example, the process may compute all pairs' similarity based on content embedding for a sample of a number of generated items (such as 20 generated items), and then select a subset of the generated items (such as 3 items) that maximize the sum dissimilarity of the items.

The system may cache the modified queries that are used to perform the search. In some instances, there may be a cache miss in the performance of step 3, the system then uses a query embedding to retrieve other most similar queries in the cache and return the confabulated exemplar content embeddings of those similar queries.

The system may store in the cache or a separate storage device or database, embeddings that are generated by the foundational generative AI model and/or the domain refined generative AI Model. For example, a generated embedding may be a vector or array of number that represent the meaning and context of tokens that the generative AI model processes and generates.

At reference 4, one or more confabulated listings are generated from the generative AI sub-system in response to the modified query. For example, the confabulated listings may include multiple item listings with information descriptive of the respective item listings, such as a textual description, one or more associated images or videos of the item in the confabulated listing.

At reference 5, the system queries or interacts with the confabulated media database. For example, the system may store the search query, search embedding, and/or the resulting confabulated listing embeddings in the confabulated media database. The confabulated media database may serve as a transactional log so that a user may research or evaluate the trained generative AI machine learning models output.

At reference 6, components of a confabulated listing are shown where an item listing includes one or more images and textual description associated with the item. The confabulated listings include embeddings generated by the trained generative AI machine learning models. The embeddings may include one or more text embeddings, one or more image embeddings and one or more multimedia embeddings.

At reference 7, a content embedding service is depicted with an input of real item listings (see reference 12) from one or more data sources, databases, online service, web sites, applications, etc. The content embedding service may create embeddings for real product items, documents, and other real items that a user is trying to find. The content embedding service creates product embeddings associated with the real product item and stores the information in a vector database. Information associated with the product embeddings may include an object type, one or more text embeddings, one or more image embeddings and one or more multimedia embeddings. It is from this vector database that the system determines a similarity of the confabulated listing embeddings (as noted with respect to reference 6) to preexisting product embeddings that are stored in the vector database.

At reference 8, a list of embeddings is shown where an embedding vector has an associated type. For example, the type of embedding may be a text type, an image type and/or a multimedia type.

At reference 9, the system compares an identifier and type to a vector database to find similar items. The vector database includes information such as an object type, text embeddings, image embeddings and multimedia embeddings. A forward index is associated with the embeddings thus allowing embeddings of the vector database to be searched based on an identifier. An item identifier, user identifier and or query identifier may be used to get embeddings.

At reference 10, the system determines for the type and identifier a similarity score.

At reference 11, an aggregator and allocator function provide second stage score. The aggregator can merge result sets from the traditional retrieve subsystem and the generative AI sub-system.

Moreover, the aggregator and allocator may log confabulated media ID used to compute similarity in retrieval for AI act compliance.

Figure 3:
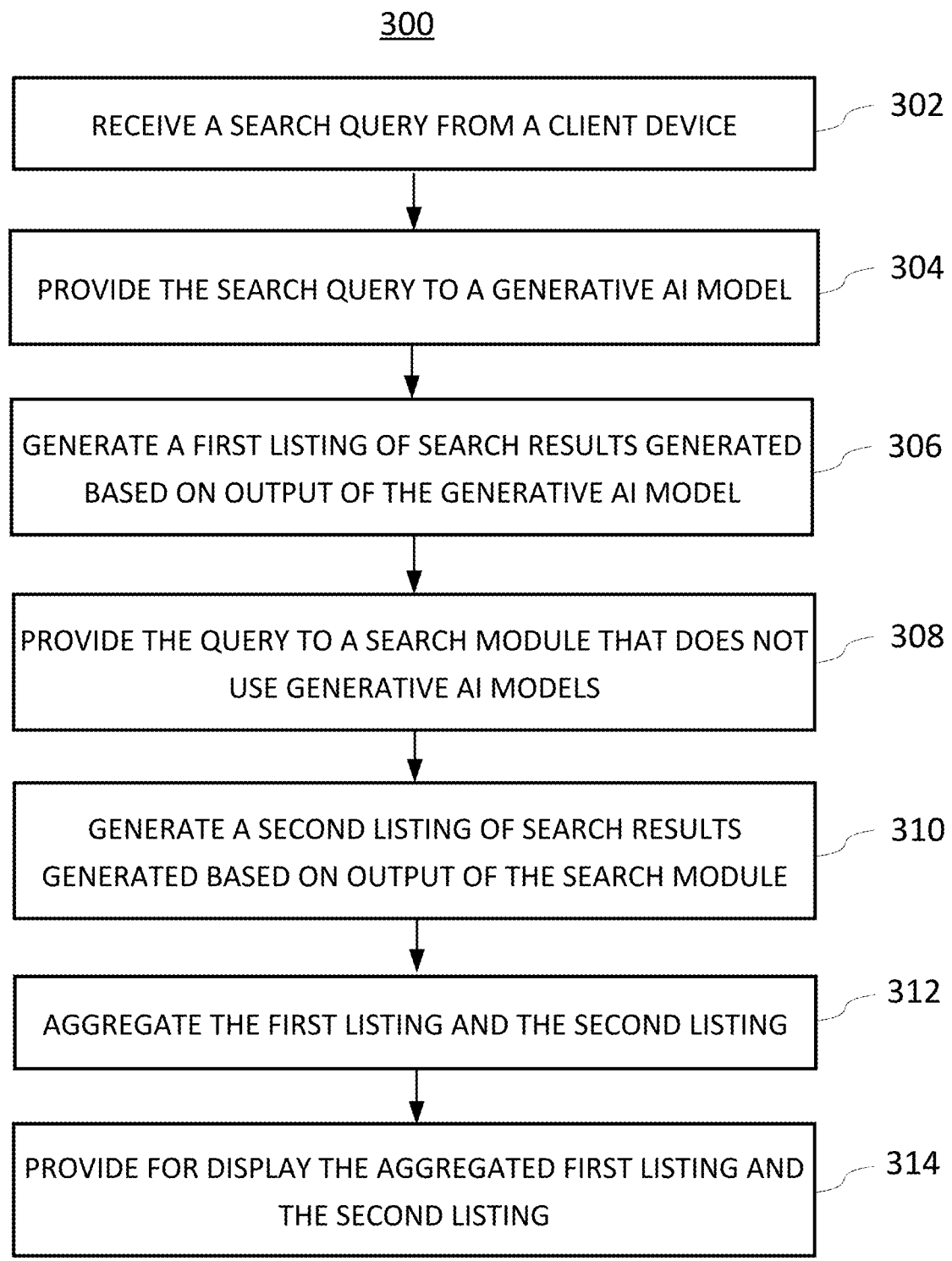
FIG. 3 is a flow chart illustrating an exemplary method that may be performed in some embodiments.

FIG. 3 is a flow chart illustrating an exemplary 300 method that may be performed in some embodiments. In some embodiments, the system performs two separate search and retrieval operations using a traditional search sub-system and a generative AI-base sub-system.

In step 302, a query is received from a client device. The client device may provide a user interface where a user may enter in search criteria to find content, media and/or product listing. The system may further augment the received query with additional content or information to search query, such as user information, category or topic tags related to the search request, or other contextual information to the received query.

In step 304, the search query, or the augmented search query, is provided to a first search sub-system that utilizes one or more trained generative AI models. The search query, or the augmented search query, is provided as a prompt to the generative AI models. In response, the generative AI models will generate an output of a confabulated listing of items responsive to the prompt. The confabulated listing of items includes one or more text embeddings, image embeddings and/or multimedia embeddings. One or more of the embeddings from the confabulated listing are compared against a vector database with pre-existing embeddings for real products, content, media or documents that could be provided as items of interest to a user. The system generates a first listing based on the pre-existing embeddings that have a threshold similarity to the embeddings from the confabulated listing. In other words, the system will find actual real listings that are similar to the confabulated listings generated by the trained generative AI models.

In step 308, the system, in parallel, provides the search query, or the augmented search query to a more traditional types of search sub-system that does not use generative AI models to generate search results.

In step 310, a traditional type of search sub-system, generates a second listing of search results using the search query.

In step 312, the system aggregates the first listing and the second listing together. The first and second listing may be sorted based on the name of the content, media or items retrieved. Also, the system may provide a graphical indication identifying which sub-system from which a particular listing was generated.

In step 314, the system provides for display the aggregated first listing and the second listing. In some embodiments, the first listing comprises a set of multiple listings of content, the content including an item textual description and one or more images associated with the content.

In some embodiments, the system determines whether a timeout period has occurred for either the generation of the first listing or the second listing. If this occurs, the system then only provides for display, only the first listing or the second listing that has been generated before the timeout period has occurred. Using the timeout period will allow the system to generate search results if either sub-system is non-responsive.

In some embodiments, the system generates the first listing comprises by providing the search query, or the augmented search query, as a prompt to a first generative AI model. The first generative AI model has been trained to provide an output based on an input for a search of content or media. Additionally, the system may provide an output of the first generative AI model to a second generative AI model. The second generative AI model may be trained on domain specific topics. The second generative AI model may provide as output the confabulated listing.

In some embodiments, the system may store the search query, or the augmented search query in a cache, or in the vector database. Also, the system may store the output from one or more generative AI models, including one or more embeddings associated with the search query and/or the response to the search query (i.e., the embeddings for the confabulated listings).

For subsequently received search queries, the system may first search the cache to find prior search results for similar previously performed searches and use prior search results stored in the cache as the first listing. In such instances, the generative AI models would no longer need to perform a search as a relevant search had been performed in the past. The cache may be periodically pruned based on an expiry date or time to remove older prior search results.

For example, search results older than n number of days may be periodically removed (i.e., deleted from the cache).

In some embodiments, the trained generative AI model may not return any or may only return a few confabulated listings for a search query. The trained generative AI model may generate a search query embedding. The search query embedding may be compared against a vector database of previously stored search query embeddings to find a similar query that had been executed before. The system may then use the similar previously stored query embedding and apply that previously stored query embedding as a prompt to the trained generative AI model to generate additional confabulated listings.

In some embodiments, the trained generative AI model may not return any or may only return a few confabulated listings for a search query. The trained generative AI model may generate a search query embedding. The search query embedding may be compared against a vector database of previously stored search query embeddings to find a similar query that had been executed before. The vector database may include an association of the stored search query embedding with one or more items. The system may then generate as the second listing with the one or more items that were associated to the previously stored search query embedding.

In some embodiments, the system may generate the second listing using the search query, or the augmented search query. The system evaluates the terms in the search query to construct a search based on the terms. In some instances, semantic terms related to the user input search terms may be added.

In some embodiments, in searching for relevant content, media or product items, the system may determine a similarity score for one or more type and identifiers related to the search query. In response, the system may retrieve multiple listings of content based on the determined similarity score.

In some embodiments, the second listing comprises a set of multiple listings of content. The content includes an item textual description and one or more images associated with the content.

In some embodiments, the system executes a content embedding service that is configured to extract product item listings from one or more databases and/or online websites providing products, content or items for download or purchase. The system stores the extracted product item listings into one or more data databases (such as a vector database). The product items are identified with an object type, one or more text embeddings, one or more image embeddings, one or more multimedia embeddings, or a combination thereof.

In some embodiments, the system uses an identifier to perform a search for relevant content. For example, the identifier may be an item identifier, user identifier, a query identifier, or a combination thereof. Based on the received identifier, the system performs a search and retrieval of one or more text embeddings and one or more image embeddings.

Figure 4:
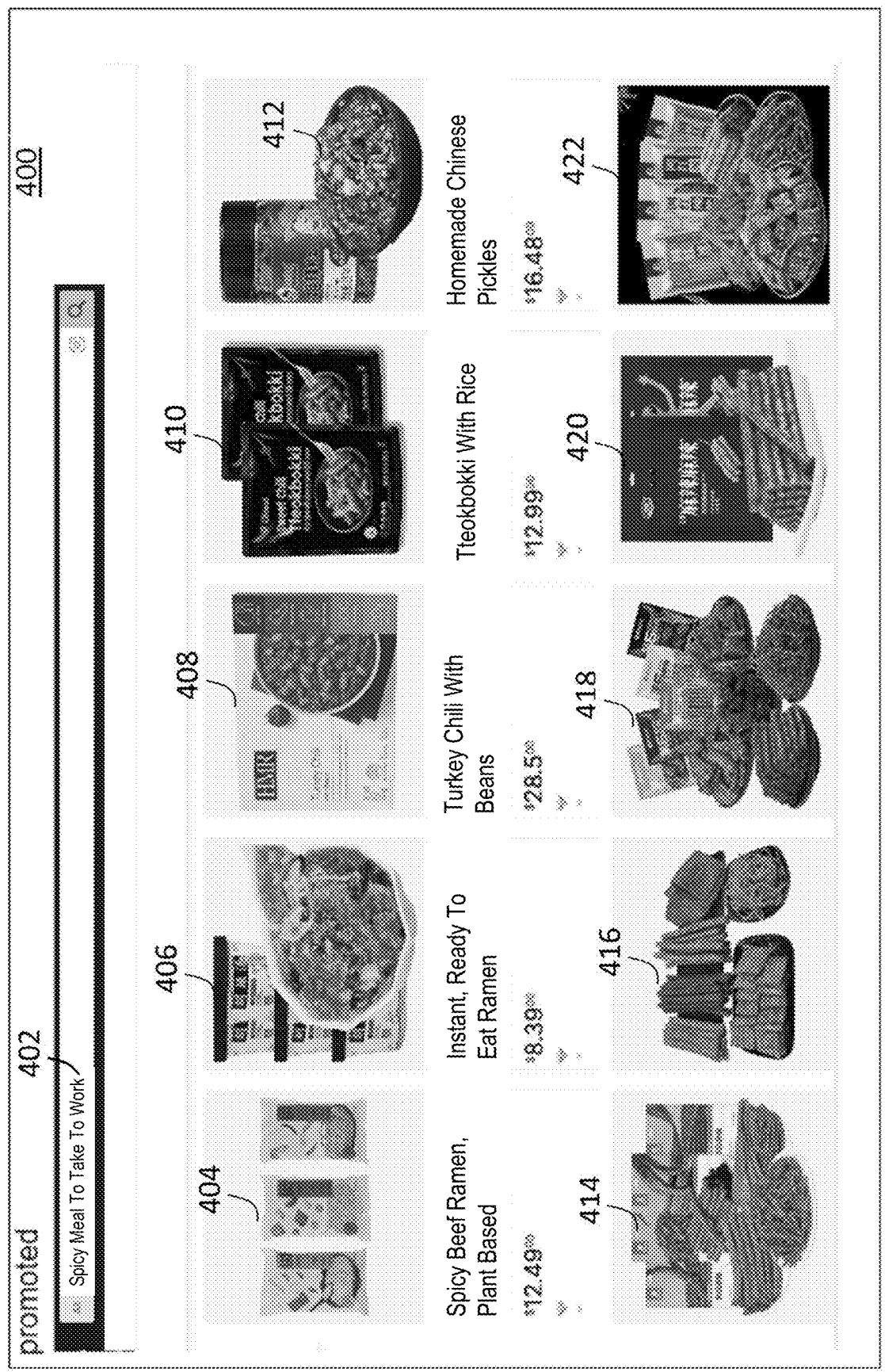
FIG. 4 is an example user interface depicting a listing of items responsive to a user query.

FIG. 4 is an example user interface 400 depicting a listing of items responsive to a user query. A user may enter a search query into an input via the user interface 400. In this example, the input is "spicy meal to take to work". As described above, the system receives the search query and performs a search via a generative AI based search subsystem and a traditional based search subsystem. Each sub-system generates a listing of search results that are eventually aggregated or combined and provided for display via the user interface. In this example, product items 404, 406, 408, 410 and 412 represent the product listing generated based on the search query being processed by the generative AI based search sub-system.

Product items 414, 416, 418, 420 and 422 represent the product listing generated based on the search query being processed by the traditional based search subsystem.

First example set. It will be appreciated that the present disclosure may include any one and up to all of the following examples:

Example 1. A method for content searching and retrieval, comprising: receiving, via a client device, an input for a search, where in the input includes text and/or one or more images; generating a search query based on the received input; providing the generated search query to one or more trained generative AI models; generating a first listing of search results generated based on the output from the one or more trained generative AI models, wherein the output comprises a confabulated listing including multiple embeddings; providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with an item description and an image.

Example 2. The method of Example 1, further comprising: determining whether a timeout period has occurred for either the generation of the first listing or the second listing; and providing for display, only the first listing or the second listing that has been generated before the timeout period has occurred.

Example 3. The method of any one of Examples 1-2, wherein generating the first listing comprises: providing the search query as a prompt to a first generative AI model, the first generative AI model trained to provide an output based on an input for a search of content or media, the output comprising one or more generated embeddings; finding similar previously stored embeddings in a vector database; and generating the first listing from the previously stored embeddings in the vector database.

Example 4. The method of any one of Examples 1-3, wherein generating the first listing further comprises: providing an output of the first generative AI model to a second generative AI model, the second generative AI model trained on domain specific topics and providing for output the first listing from the second generative AI model.

Example 5. The method of any one of Examples 1-4, wherein the first listing comprises a set of multiple listings of content, the content including an item textual description and one or more images associated with the content.

Example 6. The method of any one of Examples 1-5, further comprising: storing the search query in a cache; and storing the output from the from one or more generative AI models, wherein the output is one or more embeddings associated with the response to the search query.

Example 7. The method of any one of Examples 1-6, generating the second listing comprises: determining a similarity score for one or more type and identifiers related to the search query; retrieving multiple listings of content based on the determined similarity score.

Example 8. The method of any one of Examples 1-7, wherein the second listing comprises a set of multiple listings of content, the content including an item textual description and one or more images associated with the content.

Example 9. The method of any one of Examples 1-8, further comprising: executing a content embedding service configured to extract product item listings from one or more databases and/or online websites providing products, content or items for download or purchase; and storing the extracted product item listings into one or more data database.

Example 10. The method of any one of Examples 1-9, further comprising receiving an identifier, wherein the identifier is an item identifier, user identifier, a query identifier, or a combination thereof; and based on the received identifier, performing a search and retrieval of one or more text embeddings and one or more image embeddings.

Example 11. A system comprising one or more processors configured to perform the operations of: receiving, via a client device, an input for a search, where in the input includes text and/or one or more images; generating a search query based on the received input; providing the generated search query to one or more trained generative AI models; generating a first listing of search results generated based on the output from the one or more trained generative AI models, wherein the output comprises a confabulated listing including multiple embeddings; providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with an item description and an image.

Example 12. The system of Examples 11, further comprising the operations of: determining whether a timeout period has occurred for either the generation of the first listing or the second listing; and providing for display, only the first listing or the second listing that has been generated before the timeout period has occurred.

Example 13. The system of any one of Examples 11-12, wherein generating the first listing comprises: providing the search query as a prompt to a first generative AI model, the first generative AI model trained to provide an output based on an input for a search of content or media, the output comprising one or more generated embeddings; finding similar previously stored embeddings in a vector database; and generating the first listing from the previously stored embeddings in the vector database.

Example 14. The system of any one of Examples 11-13, wherein generating the first listing further comprises: providing an output of the first generative AI model to a second generative AI model, the second generative AI model trained on domain specific topics and providing for output the first listing from the second generative AI model.

Example 15. The system of any one of Examples 11-14, wherein the first listing comprises a set of multiple listings of content, the content including an item textual description and one or more images associated with the content.

Example 16. The system of any one of Examples 11-15, further comprising: storing the search query in a cache; and storing the output from the from one or more generative AI models, wherein the output is one or more embeddings associated with the response to the search query.

Example 17. The system of any one of Examples 11-16, generating the second listing comprises: determining a similarity score for one or more type and identifiers related to the search query; and retrieving multiple listings of content based on the determined similarity score.

Example 18. The system of any one of Examples 11-17, wherein the second listing comprises a set of multiple listings of content, the content including an item textual description and one or more images associated with the content.

Example 19. The system of any one of Examples 11-18, further comprising: executing a content embedding service configured to extract product item listings from one or more databases and/or online websites providing products, content or items for download or purchase; and storing the extracted product item listings into one or more data database.

Example 20. The system of any one of Examples 11-19, further comprising: receiving an identifier, wherein the identifier is an item identifier, user identifier, a query identifier, or a combination thereof; and based on the received identifier, performing a search and retrieval of one or more text embeddings and one or more image embeddings.

Example 21. Non-transitory computer storage that stores executable program instructions that, when executed by one or more computing devices, configure the one or more computing devices to perform operations comprising: receiving, via a client device, an input for a search, where in the input includes text and/or one or more images; generating a search query based on the received input; providing the generated search query to one or more trained generative AI models; generating a first listing of search results generated based on the output from one or more generative AI models; providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with and item description and an image.

Example 22. The non-transitory computer storage of Example 21, further comprising the operations of: determining whether a timeout period has occurred for either the generation of the first listing or the second listing; and providing for display, only the first listing or the second listing that has been generated before the timeout period has occurred.

Example 23. The non-transitory computer storage of any one of Examples 21-22, wherein generating the first listing comprises: providing the search query as a prompt to a first generative AI model, the first generative AI model trained to provide an output based on an input for a search of content or media.

Example 24. The non-transitory computer storage of any one of Examples 21-23, wherein generating the first listing further comprises: providing an output of the first generative AI model to a second generative AI model, the second generative AI model trained on domain specific topics and providing for output the first listing from the second generative AI model.

Example 25. The non-transitory computer storage of any one of Examples 21-24, wherein the first listing comprises a set of multiple listings of content, the content including an item textual description and one or more images associated with the content.

Example 26. The non-transitory computer storage of any one of Examples 21-25, further comprising: storing the search query in a cache; and storing the output from the from one or more generative AI models, wherein the output is one or more embeddings associated with the response to the search query.

Example 27. The non-transitory computer storage of any one of Examples 21-26, generating the second listing comprises: determining a similarity score for one or more type and identifiers related to the search query; and retrieving multiple listings of content based on the determined similarity score.

Example 28. The non-transitory computer storage of any one of Examples 21-27, wherein the second listing comprises a set of multiple listings of content, the content including an item textual description and one or more images associated with the content.

Example 29. The non-transitory computer storage of any one of Examples 21-28, further comprising: executing a content embedding service configured to extract product item listings from one or more databases and/or online websites providing products, content or items for download or purchase; and storing the extracted product item listings into one or more data database.

Example 30. The non-transitory computer storage of any one of Examples 21-29, further comprising: receiving an identifier, wherein the identifier is an item identifier, user identifier, a query identifier, or a combination thereof; and based on the received identifier, performing a search and retrieval of one or more text embeddings and one or more image embeddings.

Generative Example Listing Query Expansion with Introspection, Optimization, and Integration with Non-Generative AI Search Further aspects of the system are described with regard to expanding generative example listings. In some embodiments, the system uses one or more trained generative AI models to create mocked or artificial good results to find similar real or actual good results.

As used herein, words such as "document" "listing" and "response" may be understood to be interchangeable. Typically, "listings" in search retrieval literature are called "documents" but they may not need to be text documents, but any unit of media that is a single "item" as relevant to that system (e.g., a song, a video clip, a freelancer profile, a SKU, a webpage, etc.).

While the system provides for searching of content and media, the system may be configured to include recommendations, ads, targeted promotions, and content feeds.

In some examples, traditional "content embedding" search and retrieval encodes user queries and document or listing responses as numeric vectors. Documents are then retrieved by vector similarity using a vector database. However, this approach requires learning different transformations for queries and items, typically using a tremendous degree of high-quality query-response pairs, which are expensive to produce and may not be available. General media embeddings systems exist, but because literal query text is very different than the literal text of the corresponding matching ideal results, direct similarity performs poorly and often underperforms simpler techniques like keyword-based retrieval with basic keyword processing like spellchecking and stemming. A domain-specific mapping of query-space to document-space is still required. Furthermore, these embeddings are entirely opaque to humans. This makes understanding and improving performance challenging. As AI bias regulation evolves worldwide, not being able to explain why an AI system prefers some results over others may create additional liabilities.

In some embodiments, the system uses one or more generative AI models (such a large language models). The system may use a base generative AI model (such as an OpenAI system). A base generative AI model may be trained to refine the generative AI model using all listings or documents in a target domain so that generative AI results better resemble the entire corpus of available results. For example, in the context of searching for talent or employee jobs, multiple job profiles and/or employee resumes for talent may be used to refine the generative AI model. Such multiple job profiles and employee resumes may be obtained from employee job search systems (such online services as LinkedIn, Upwork, Monster, Indeed, etc.).

In some embodiments, in the context of people or talent searching for employment or contracting, the system may account for AI Bias regulation. In other words, the system may be configured to ensure that sampled example results are balanced across target attributes, like age, gender and race where such demographics do not influence or bias search results generated by a generative AI model. Such AI Bias regulation produces search relating only to germane work experience and/or educational experience without the influence of an individual's demographics.

In some embodiments, the system uses one or more trained generative AI models to generate example good responses from a received user query. A common application is formatted text; however, the media may include images, audio, video, and structured data. The system may transform generated listings into media embeddings and use a vector database to retrieve real listings by vector similarity. One or several responses are generated (For example 3 responses may be generated, and limited by infrastructure constraints, cost, and marginal benefit of more generations). The example good responses do not necessarily need to be created by generative AI. They may be selected real listings identified as relevant by a combination of user feedback and editor review.

In some embodiments, when generating or selecting multiple good responses, a large pool of responses may be generated. Then, some of the good responses are selected as representative good responses (a tuning parameter, for example, three) that are "far away" from each other in embedding space, but are all good responses to the query. The system may select an n number of good responses, using any state-of-the-art technique to choose the n number of the good responses, such as K-Means clustering. This allows the retrieval system to retrieve items that may be multiple different interpretations of a good response.

In parallel, the system may use a traditional keyword-with-expansion-and-rule based retrieval system or query an embedding retrieval system. If using multiple example "good responses" for retrieval, each example may be a separate retrieval call to a vector database, or the multiple embeddings may be combined using standard techniques like mean vector or max-per-dimension vector. The exact details of many times the retrieval system is a called and how embedding vectors are combined, if at all, are tuning parameters.

The system may await all responses from the retrieval system. Annotate each document response from each retrieval call with which retrieval system returned the result and any associated search retrieval score, for example, vector similarity for content embeddings and text match (e.g., BM25) for keyword retrieval.

For documents returned by embedding similarity to a generated or example "good response," annotate that document with what "good response" returned that document and the similarity score. One implementation is to save the "good responses" in a database and reference them by an identifier and log the identifiers. A document may have multiple "good responses" attached if multiple good responses were used.

The system, in a search ranking sub-system, may merge together all the sets of documents from all retrieval systems. The system may optionally generate a final allocation, using additional quality scoring models and business rules. If content embeddings were used, use the content embedding vector from any "good example" that retrieved that example and any similarity scores associated with that embedding. There may be multiple similarity scores and multiple embeddings used as features in the search ranking models. This allows the search system to include items from a previous search system while also including items from a newer "embedding-based" system to make the resulting merged system better in recall than either system alone.

Figure 5:
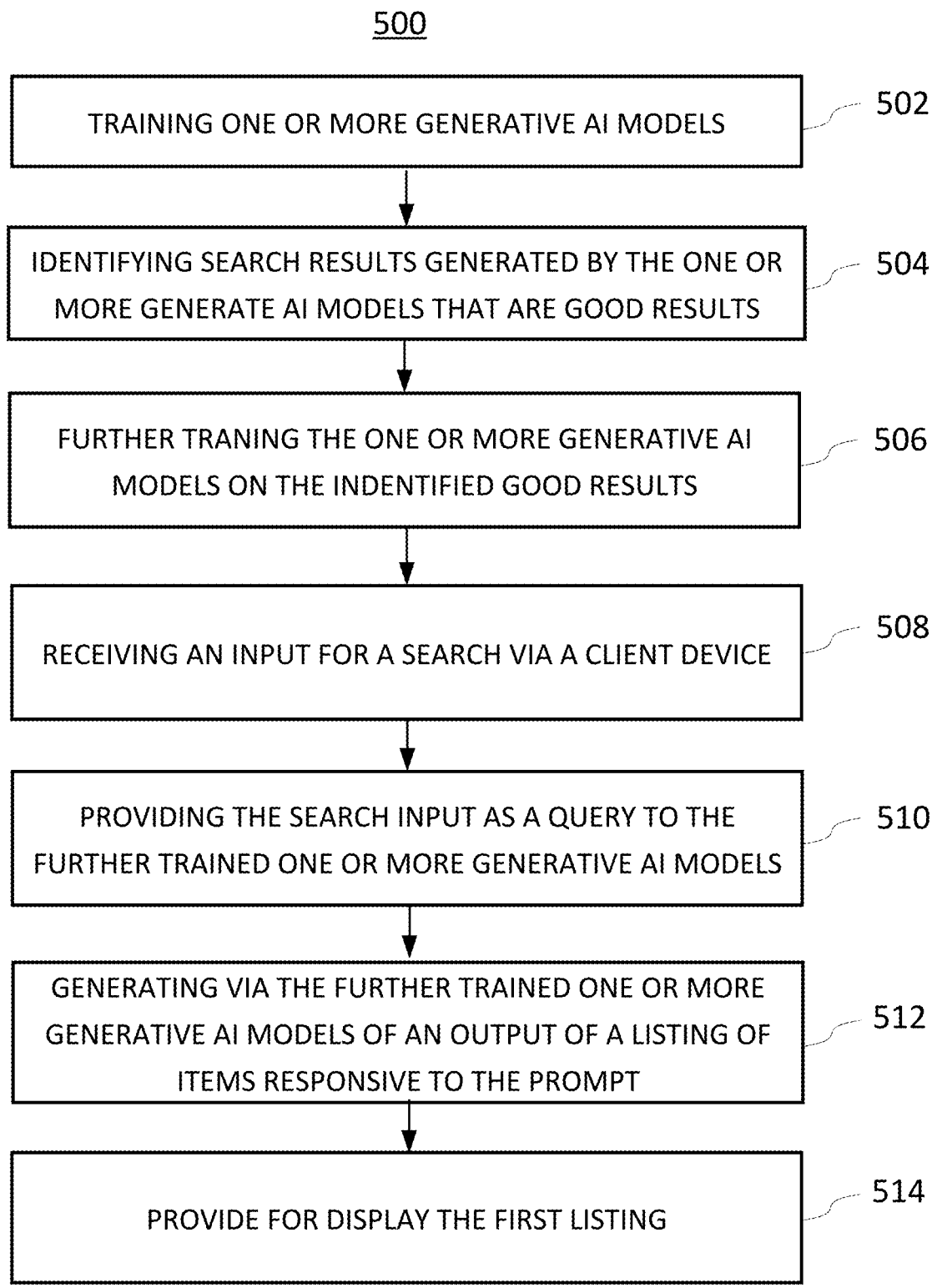
FIG. 5 is a flow chart illustrating an exemplary method that may be performed in some embodiments.

Referring now to FIG. 5, a flow chart illustrating an exemplary method 500 that may be performed in some embodiments is described. As described above, one or more trained generative AI may be used to produce a listing of items responsive to a search query.

In step 504, one or more generative AI models are trained to produce an output responsive to a prompt. The system may provide supervised training where a user may identify one or more search results that are good search results. In other words, a user may confirm search results that are more relative to the prompt.

In step 506, the one or more generative AI models may be further trained on the identified good search results. Subsequent to this further training, using the same prompt input, the one or more generative AI models would produce search results related more to the identified good search results.

In step 508, an input is received via a user interface of a client device as a search query to be performed by the system.

In step 510, the input search query is provided, at least in part, as a prompt to the one or more further trained generative AI models.

In step 512, the further trained generative AI models generate an output of a listing of items responsive to the prompt.

In step 514, the listing of items are provided for display via the user interface of the client device.

In a reporting system for search, for each search response, report which "good responses" were used to generate the examples and for each retrieved and delivered result, which retrieval system corresponding to which "good response." Include embedding similarity scores, if any, and the importance of the similarity score(s) in ranking and allocation, if any. These "example responses" help explain why certain items were retrieved and ranked in a human-intelligible and transparent way. This may be used for debugging, understanding, and for AI bias compliance.

In some embodiments, the system generates aggregate metrics for internal reporting for search responses. Include aggregates of which good examples were used for which queries and with what frequency items retrieved by these examples were delivered to users. Aggregate reports may be like particular response reports.

In some embodiments, the system generates a user interface configured to allow users to manually add, edit or exclude "good examples" associated per query. Optionally, the system may provide functionality show depicts how search results may change based on the underlying "good examples." The system may use the user responses to search listings associated with various "good examples" per query to generate supervised training data to improve the generative AI's ability to generate "good examples" for a specific domain and as refined by editors.

In some embodiments, the system may generate reports which identify search results that are returned by traditional keyword retrieval and those search results which are returned by embeddings to show the incremental retrieval impact of embeddings.

In some instance, the system may experience a delayed expanded response. For example, generative AI processing can be slow in comparison to optimized keyword-based retrieval systems. It may take a couple of seconds for generative AI models to produce "good examples." However, keyword systems can return results in a few hundred milliseconds or fewer. The system may return the first few results from the faster system and after a second or so, fill in the results from the slower generative AI system if necessary.

In some embodiments, "good responses" (or even real examples) may include attributes that are protected by AI Bias laws, like gender and race. The system may use train a classifier (ML or rule-based or both) to identify such use of attributes that may potentially violate AI Bias regulations and reject them for use in search retrieval. (for example, mentions of gender and race) Use violating or potentially violating examples as negative training examples in the Generative AI refinement model for generating "good examples."

In some embodiments, for queries without an exemplar that needs generation, and generation takes only a few millisecond, the system may perform traditional retrieval and exemplar generation in parallel. The system may then only use the exemplar similarity in ranking as an ML feature. If the exemplar isn't generated in time, or a use budget is exceeded, then ranking will still proceed, but missing that signal. The exemplar may be cached for use in later retrieval operations.

Second example set. It will be appreciated that the present disclosure may include any one and up to all of the following examples:

Example 31. A method for content searching and retrieval, comprising: training one or more generative AI models to generate a listing of search results based on an input prompt; generating initial search results by the trained one or more generative AI models; identifying one or more of the search results that are good examples, and further training or weighting the one or more generative AI models with the identified good examples; receiving, via a client device, an input for a search, where in the input includes text; generating a search query based on the received input; providing the generated search query to the one or more trained generative AI models; generating a first listing of search results generated based on the output from one or more generative AI models; providing for display, the first listing of search results, wherein the aggregated listing of search results includes a listing of items with an item description.

Example 32. The method of Example 31, further comprising: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 33. The method of Example 31, further comprising: determining whether the representative example search result is allowable; and not using the representative example search result where the example search result is determined not to be allowable.

Example 34. A system comprising one or more processors configured to perform the operations of: training one or more generative AI models to generate a listing of search results based on an input prompt; generating initial search results by the trained one or more generative AI models; identifying one or more of the search results that are good examples, and further training or weighting the one or more generative AI models with the identified good examples; receiving, via a client device, an input for a search, where in the input includes text; generating a search query based on the received input; providing the generated search query to the one or more trained generative AI models; generating a first listing of search results generated based on the output from one or more generative AI models; providing for display, the first listing of search results, wherein the aggregated listing of search results includes a listing of items with an item description.

Example 35. The system of Example 34, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 36. The system of Example 34, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 37. Non-transitory computer storage that stores executable program instructions that, when executed by one or more computing devices, configure the one or more computing devices to perform operations comprising: training one or more generative AI models to generate a listing of search results based on an input prompt; generating initial search results by the trained one or more generative AI models; identifying one or more of the search results that are good examples, and further training or weighting the one or more generative AI models with the identified good examples; receiving, via a client device, an input for a search, where in the input includes text; generating a search query based on the received input; providing the generated search query to the one or more trained generative AI models; generating a first listing of search results generated based on the output from one or more generative AI models; providing for display, the first listing of search results, wherein the aggregated listing of search results includes a listing of items with an item description.

Example 38. The non-transitory computer storage of Example 37, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 39. The non-transitory computer storage of Example 37, further comprising the operations of: determining whether the representative example search result is allowable; and not using the representative example search result where the example search result is determined not to be allowable.

User-Guided Search Retrieval

In some embodiments, the system generates a user interface where a user may input one or more "good examples". The system may use the "good examples" provided by a user for introspection, compliance, debugging, and use in optimization. For example, a "good example" may be displayed, via the user interface to a user. The user interface may be configured to allow a user to edit or write their own "good example" with the system providing search result or listing via the user interface. The search result may be displayed via a query interface itself, or the search results may be generated as an extension or refinement to a short traditional search query. If the "good example" is generated by one or more generative AI models, then system may annotate that the results are generated by the one or more generative AI models. Such annotation by the system may ensure that the system is in compliance with future AI bias compliance laws or regulations.

In some embodiments, the system uses a classifier to determine whether the "good example" provided by the user is potentially in violation of AI bias laws. If the system determines that the user provided "good example" is classified as a potential violation, then the system would refuse to use the user provided "good example" in search retrieval and log the incident for compliance and review.

Third example set. It will be appreciated that the present disclosure may include any one and up to all of the following examples:

Example 31. A method for content searching and retrieval, comprising: receiving, via a client device, an example of a representative example search result; using the representative search result to train one or more generative AI models; receiving, via a client device, an input for a search, where in the input includes text; generating a search query based on the received input; providing the generated search query to the one or more trained generative AI models; generating a first listing of search results generated based on the output from one or more generative AI models; providing for display, the first listing of search results, wherein the aggregated listing of search results includes a listing of items with an item description.

Example 32. The method of Example 31, further comprising: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 33. The method of Example 31, further comprising: determining whether the representative example search result is allowable; and not using the representative example search result where the example search result is determined not to be allowable.

Example 34. A system comprising one or more processors configured to perform the operations of: receiving, via a client device, an example of a representative example search result; using the representative search result to train one or more generative AI models; receiving, via a client device, an input for a search, where in the input includes text; generating a search query based on the received input; providing the generated search query to the one or more trained generative AI models; generating a first listing of search results generated based on the output from one or more generative AI models; providing for display, the first listing of search results, wherein the aggregated listing of search results includes a listing of items with an item description.

Example 35. The system of Example 34, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 36. The system of Example 34, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 37. Non-transitory computer storage that stores executable program instructions that, when executed by one or more computing devices, configure the one or more computing devices to perform operations comprising: receiving, via a client device, an example of a representative example search result; using the representative search result to train one or more generative AI models; receiving, via a client device, an input for a search, where in the input includes text; generating a search query based on the received input; providing the generated search query to the one or more trained generative AI models; generating a first listing of search results generated based on the output from one or more generative AI models; providing for display, the first listing of search results, wherein the aggregated listing of search results includes a listing of items with an item description.

Example 38. The non-transitory computer storage of Example 37, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 39. The non-transitory computer storage of Example 37, further comprising the operations of: determining whether the representative example search result is allowable; and not using the representative example search result where the example search result is determined not to be allowable.

Confabulated Collaborative Filtering Recommendation and Content Targeting

In some embodiments, the system may be further configured for confabulated collaborative filtering recommendation and digital media targeting. The system may be configured to provide user interest to influence search results.

Rather than using a user input for a search, the system uses as the prompt to the one or more generative AI models is the past history and attributes of the user. This past history and attributes of the user provide a context for the response of content, media and/or products in a domain that the user "would like." Functionality for similarity searching and retrieval processes may be implemented in the same manner as previously described.

In some embodiments, the one or more generative AI models may be trained in an unsupervised training process of tuning the general generative AI model to the domain subject matter, and continuously using a supervised training process to learn which confabulated recommendations are used in retrieval to successfully achieve an outcome, like a sale or ad click.

Fourth example set. It will be appreciated that the present disclosure may include any one and up to all of the following examples:

Example 41. A method for content searching and retrieval, comprising: generating a search query based past historical searches by a user and/or attributes of the user; providing the generated search query to one or more trained generative AI models; generating a first listing of search results generated based on the output from one or more generative AI models; providing for display, the first listing of search results, wherein the aggregated listing of search results includes a listing of items with an item description.

Example 42. The method of Example 41, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 43. A system comprising one or more processors configured to perform the operations of: generating a search query based past historical searches by a user and/or attributes of the user; providing the generated search query to one or more trained generative AI models; generating a first listing of search results generated based on the output from one or more generative AI models; providing for display, the first listing of search results, wherein the aggregated listing of search results includes a listing of items with an item description.

Example 44. The system of Example 43, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Example 45. Non-transitory computer storage that stores executable program instructions that, when executed by one or more computing devices, configure the one or more computing devices to perform operations comprising: generating a search query based past historical searches by a user and/or attributes of the user; providing the generated search query to one or more trained generative AI models; generating a first listing of search results generated based on the output from one or more generative AI models; providing for display, the first listing of search results, wherein the aggregated listing of search results includes a listing of items with an item description.

Example 46. The non-transitory computer storage of Example 45, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of items with item description.

Cross-Language Query Retrieval and Ranking

In some situations, much of search, feed, and ads retrieval and relevance work is limited to a single language, typically English. One challenge is to generalize semantic embeddings learned for one language to another language. Another challenge is to discover and deliver contents originally composed in one language (e.g., Korean) for presentation in another language (e.g., English). As automated translation tools become more viable and e-commerce rises in popularity internationally where a diversity of languages is common, this is more important.

The above system functionality described herein may be further configured to address learning cross-language relationship between query, user-interest. For example, the system may generate examples in different languages, or use a translation system to translate previously generated examples into different languages. The latter may be more efficient if translation is faster and cheaper than generation.

In some embodiments, for indexing, the system may pre-translate documents into other target languages and generate those translated documents into their own language-specific embeddings. Depending on the system configuration, the system may use either or both the translated exemplar or the translated targeted document in retrieval to get a bigger retrieval set with more recall and as ranking features. The system may annotate the user's language preference (such as relevance matching the user's language preference, geo region, and query language can be more highly prioritized.)

Fifth example set. It will be appreciated that the present disclosure may include any one and up to all of the following examples:

Example 51. A method for content searching and retrieval, comprising the operations of: translating a set of electronic documents from a first language to a second language; storing the first set of documents in the first language and a second set of the translated documents in the second language, where the translated documents are associated with the first set of documents in the first language; receiving, via a client device, an input for a search, where in the input includes text in the first language; translating the text first language to the second language; generating a search query based on the received input in the second language; providing the generated search query to one or more trained generative AI models; generating a first listing of search results generated based on the output from one or more generative AI models, wherein the first listing includes one or more documents from the second language; finding translated documents in the first language corresponding to the one or more documents in the second language; providing for display, the first listing of search results, wherein the first listing of search results includes a listing of the documents in the first language.

Example 52. The method of Example 51, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of documents in the first language.

Example 53. A system comprising one or more processors configured to perform the operations of: translating a set of electronic documents from a first language to a second language; storing the first set of documents in the first language and a second set of the translated documents in the second language, where the translated documents are associated with the first set of documents in the first language; receiving, via a client device, an input for a search, where in the input includes text in the first language; translating the text first language to the second language; generating a search query based on the received input in the second language; providing the generated search query to one or more trained generative AI models; generating a first listing of search results generated based on the output from one or more generative AI models, wherein the first listing includes one or more documents from the second language; finding translated documents in the first language corresponding to the one or more documents in the second language; providing for display, the first listing of search results, wherein the first listing of search results includes a listing of the documents in the first language.

Example 54. The system of Example, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of documents in the first language.

Example 55. Non-transitory computer storage that stores executable program instructions that, when executed by one or more computing devices, configure the one or more computing devices to perform operations comprising: translating a set of electronic documents from a first language to a second language; storing the first set of documents in the first language and a second set of the translated documents in the second language, where the translated documents are associated with the first set of documents in the first language; receiving, via a client device, an input for a search, where in the input includes text in the first language; translating the text first language to the second language; generating a search query based on the received input in the second language; providing the generated search query to one or more trained generative AI models; generating a first listing of search results generated based on the output from one or more generative AI models, wherein the first listing includes one or more documents from the second language; finding translated documents in the first language corresponding to the one or more documents in the second language; providing for display, the first listing of search results, wherein the first listing of search results includes a listing of the documents in the first language.

Example 56. The non-transitory computer storage of Example 55, further comprising the operations of: providing the generated search query to a search module, wherein the search module does not use a generative AI model to determine the search results; generating a second listing of search results based on the search module; aggregating the first listing of search results and the second listing of search results; providing for display, the aggregated listing of search results, wherein the aggregated listing of search results includes a listing of documents in the first language.

Search and Content Ranking Applications

Figure 6:
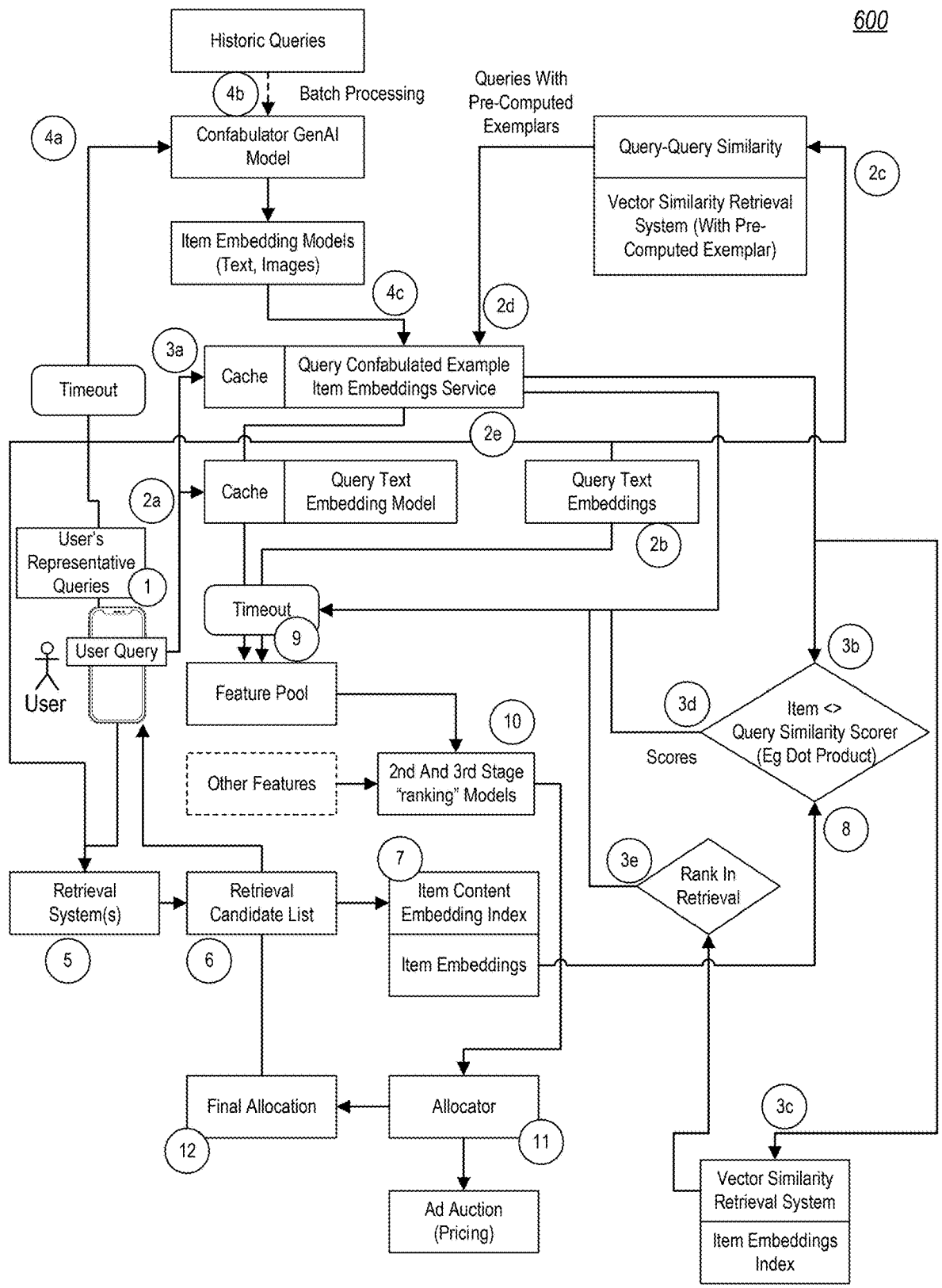
FIG. 6 is a diagram illustrating an exemplary method using an exemplary computer system.

FIG. 6 is a diagram illustrating an exemplary method using an exemplary computer system.

In step 1, the system 600 receives a search query. For example, the system may present a user interface where a user may enter a search query. A query may also be generated by other system or software applications (such as an AI chatbot) and input into the system 600 as the query. The query may be augmented or generated using a profile associated with the user. The profile may include information about the user's interest and/or categories of past behavior. The user profile provides context to create recommendations for content (such as audio, text, graphics, videos, media and/or advertisements). The profile information may be searched from a database or data storage device and augmented to the search query as key words or weighted terms that provide additional context for the search. In some embodiments, a query may be generated by the system 600, where the query is a predefined query with predefined text for the query. In some embodiments, a query may be generated based on categories or key words or terms.

In step 2, the system 600 performs operations related to query embedding. In step 2.*a*, the system 600 converts the received search query into an embedding vector by input the received search query into a machine learning model trained to generate text embeddings. For example, the system 600 may use a query text embedding model to generate one or more embedding vectors based on input of the received search query. In some embodiments, in addition to, or in lieu of, using the query text embedding model, the system 600 may cache the results of the output embedding vectors into a database or other memory storage device. Subsequent received search queries may be compared to the cache to determine and use embedding vectors already created, that are related to similar previous received search queries.

In step 2.*b*, the system 600 caches or stores the generated one or more embedding vectors in a feature pool. For example, the feature pool collects features for use in machine learning inference and applying some timeout to proceed with an inference even if some features have not been sent to the feature pool after some amount of predetermined time (such as 20 ms).

In step 2.*c*, the system transmits the generated query embeddings to a vector database to find the top-k (e.g., 1 to 3) most similar queries with pre-existing exemplar embeddings computed that are "similar enough" based on some predetermined similarity threshold value. The system may find the Kth top number of similar pre-existing exemplar embeddings. The k value may be modified to tune the results of similar matches. For example, the similarity threshold may be adjusted to increase or decrease the similarity of the matches thereby increasing or decreasing the number of matches. Where the system 600 determines a direct match for a pre-existing exemplar item embodiments for the query, then step 2.*c* may be skipped. In other words, the system 600 does not need to approximate matched where a direct or exact match already exists.

In step 2.*d*, the pre-computed exemplar item embeddings associated with the top-k similar queries found in step 2.*d*, are returned by the system 600 using queries with precomputed and available confabulated exemplar item embeddings.

In step 2.*e*, in parallel the system may use the query embeddings to search and retrieve items from a vector database of item embeddings. The additional items may be used by the system 600 as an additional retrieval source of items to rank.

The system 600 performs operations to retrieve corresponding confabulated item embeddings. In step 3.*a*, the system uses the received search query to retrieve corresponding confabulated item embeddings. In some embodiments, the system 600 uses a memory cache, a database, or other storage device to store confabulated item embeddings. The system retrieves the confabulated item embeddings to the model as features directly, subject to a timeout period. The system 600 may retrieve multiple items with multiple types of embeddings.

In step 3.*b*, the system 600 compares the retrieved confabulated item embeddings to each retrieved item embeddings and generates similarity scores (e.g., dot products). The system compares embeddings of the system type to each other. The embeddings may be of different types, such as a text type, image type, etc. If, for example, the text of a confabulated item and a real item are identical, then the system would determine a similarity score of 100%. If the text of a confabulated item and a real item are not identical, but have a similar meaning of the text, then the system would determine a similarity score of less than 100%.

In step 3.*c*, in parallel, the system 600 retrieves real items that are similar to the confabulated items by determining content embedding using a vector database. The system 600 retrieves the top-K (e.g., top 20-200) most similar real items.

In step 3.*d*, the system 600 the system determines confabulated items versus retrieved-to be-delivered similarity and provides as a feature to the feature pool via the timeout mechanism. In other words, the system determines how similar is a real item to be allocated to the confabulated exemplar (such as a fake, but plausible item). The step may be performed for all items to be allocated to the feature pool.

In step 3.*e*., the system 600 in an alternative method, provides a rank and derived rank features such a "normalized relative similarity" (similarity*K/sum (similarity)) for items retrieved in step 3.*c*. In other words, the system 600 may determine whether the item to be allocated to the feature pool in the ranked set of most similar real items overall. The step may be performed for all items to be allocated to the feature pool.

The system 600 performs operations to generate confabulated exemplars. In step 4.*a*., the system 600 generates one or more new confabulator exemplar items from the received query using a trained generative AI model. The trained generative AI model is trained to output exemplar items from a received query input. The trained generative AI model generates ideal listings in text and imagery that can be compared to real listings. However, the ideal listings generated by the generative AI model are deliberately not real listings. In some embodiments, generating a confabulated example for a received search query takes too long and costs too much in computing resources to be generated on every query. In such cases, the system 600 may apply a timeout that causes this computing path to be abandoned so that the system may return to the user a search ranking response in a reasonable amount of time.

While not shown, the confabular request may continue to execute asynchronously. When the request in step 4.*a*. does eventually complete (e.g., 1-3 seconds after a response is sent to the user), the system 600 may proceed with an updated response using the new confabulated exemplar for use in search retrieval and search ranking. The system may generate and display a user interface of the search ranking results then receives the "update listings" response and potentially updates the listings shown to the user.

In step 4.*b*, rather than a using "live" user query, the system may use a list of frequent or representative past queries to generate confabulated example.

In step 4.*c*. each confabulated example is converted to content embeddings for text and images and saved in a Query Confabulated Example Service for use in multiple workflows. In some embodiments, the system 600 generates a confabulated item as content embeddings directly versus first being human-consumable image and text first and then being converted into content embeddings.

In step 5, the system 600 may use standard search retrieval system based on keywords, filters, and content embeddings.

In step 6, the system 600 provides a list of items that could be shown to the user as returned by the retrieval system.

In step 7, the system 600 provides a forward index for fetching item embeddings per each item in the Retrieval Candidate List.

In step 8, the system 600 compares each of the Retrieval Candidate Item embeddings with the query's confabulated example embeddings of the same type to generate the "similarity scores" used in the Feature Pool in 3.*d*.

In step 9, the system applying the timeout period of the Feature Pool waits some amount of time (e.g., 20 ms) for all feature pipelines to produce features. Once the timeout period expires, the Feature Pool is closed, and model inference begins.

In step 10, the system 600 uses 2nd and 3rd stage machine learning ranking models for predicting quality, clicks, conversions, and other scores used in allocation consume the features in the Feature Pool (in combination with other signals) to make inferences. The 2nd and 3rd stage machine learning rank models out model inferences.

In step 11, the system 600 uses the model inferences generated from step 10, via an allocator module, to generate an allocation of items from the set of items in the step 6, Retrieval Candidate List. An asynchronous process for advertisement or content auctioning may be performed to influence the allocator. Moreover, logging or other post processing may be performed by the system 600. The product items display may be sorted or ranked based on a ranking value that indicates a position of the product item to be displayed.

In step 12, the system 600 performs a final allocation process. The system 600 provides a final allocation of the items for display, via a user interface of a client device. The displayed items may be displayed a listing format (e.g., similar to Google search result listing), or in any sequence, such as in time in video or audio media on YouTube or a video reel on TikTok.

Figure 7:
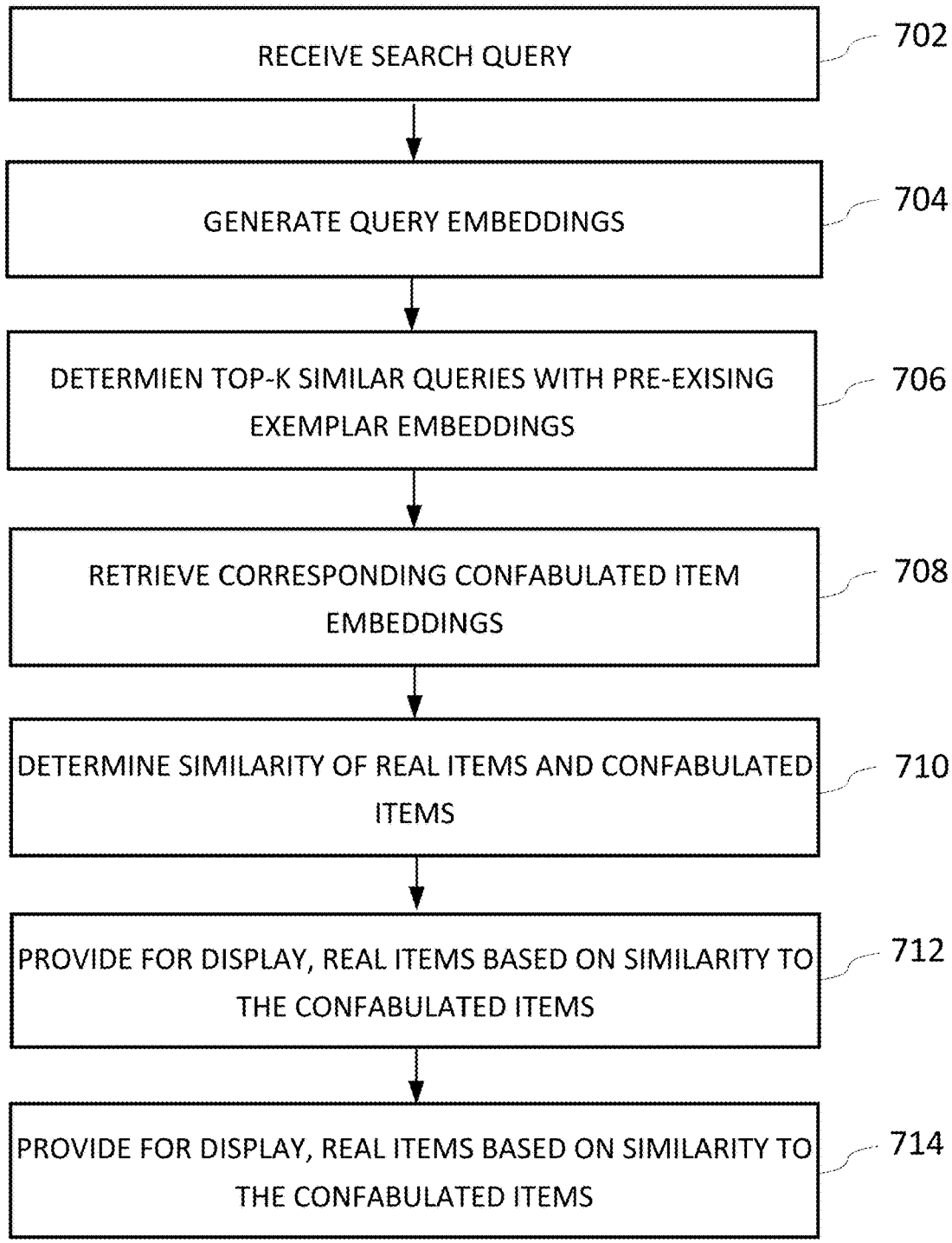
FIG. 7 is a flow chart illustrating an exemplary method that may be performed in some embodiments.

Referring to FIG. 7, the process as described in FIG. 6 is generally described. In step 702, the system 600 receives a search query. In step 704, the system 600 generated one or more query embeddings based on the received search query. In step, 706 the system 600 determines top-k similar queries with pre-existing exemplar embeddings. In step 708, the system 600 retrieves corresponding confabulated item embeddings. In step 710, the system 600 determines similarity of real items and confabulated items. In step 712, the system 600 provides for display, a listing of real items based on similarity to the confabulated items.

The operations of system 600 may be further understood with the following description of a working example. A user may be interested in searching for food for their pet cat. The user enters a search query via an input via a user interface. For example, the user enters the text "chicken cat food" and includes a search filter of products under $10.

The search retrieval system (5 of FIG. 6) uses the received search query and applied filters. The system 600 queries text embeddings (2.*b*) to fetch N plausibly relevant candidates, say 100 types of cat food items (e.g., products), but also maybe some dog food and chicken products that are not for cats are also candidates. The system may use multiple retrieval systems running in parallel to create the union of the retrieval sets. The search filter excludes all candidates with prices >=$10. ["cat food A", "cat food B", "beef cat food", "chicken dog food", "chicken cat food brand A"].

The system 600 fetches the item content embeddings for all retrieved items that could be delivered using a forward index. The embeddings of each item are made available as features to the model for that item through the timeout. The embeddings are also kept in memory in the Ranking System for comparison with other embeddings to compute similarity scores in future steps. For example, embeddings are the items may be described as:

{"cat food A": {"textEmbedding": x1, "imageEmbedding": y1},
"cat food B": {"textEmbedding": x2, "imageEmbedding": y2},
"beef cat food", . . . }

The system 600 determines how well the query "chicken cat food" matches the items available to be allocated so that the system 600 can generate the best allocation. The system generates many features of "match quality" to be fed into a machine learning model that makes final decisions. The system makes three types of comparisons to compute "similarity" features with the query using the item embeddings (as described in the previous paragraph).

The system needs to convert the query into "embeddings" itself. The system 600 may use different operations to accomplish this. For example, the system 600 may perform three different methods of generating "query embeddings" for "chicken cat food" to compare against the embeddings of each item that could be allocated.

In a first example, the system 600 may directly convert the query to text embeddings. In this first example, the system uses a traditional method. The resulting embeddings for "chicken cat food" may be similar to embeddings for "fish cat food" but dissimilar to "apples". This is how many vector search engines work today. Sometimes, the system tunes the embeddings using supervised data to match query and item text more correctly for a given domain. In this first example, the system compares the embeddings of different "things:" "queries" and "items."

In a second example, the system 600 uses the pipeline (step 3*a*-3*e*) to generate confabulated example items. The system 600 then converts the confabulated example items to embeddings. In some situations, the generative AI model creates a fake cat food product called "Max Tasty Catfood— Chicken flavor" with a hallucinated product image and description. This "confabulated" product is not real, but it's similar to a real product that that the user would want. In this example, the system 600 converts the fake item into item content embeddings using the same model as used for real items. The system 600 compares the embeddings of the confabulated example to real items. Here, system 600 is comparing embeddings of "things" of the same type: the query has been converted to an item using generative AI, and that confabulated item is directly compared to other real items to compute similarity.

In a third example, the system 600 uses the query embedding from the first example in step (2.*c* of FIG. 6) to find other similar queries by precomputed query embeddings. In some cases, system 600 does not have a precomputed confabulated example for "chicken cat food" and the system does not have time to wait for one to be generated. However, perhaps the system 600 already has "cat food" pre-computed. "Cat food" is similar to "chicken cat food," so in this case the system 600 would use the confabulated example for "cat food" in place of the confabulated example for "chicken cat food" as a proxy.

In a fourth example, the system 600 uses the confabulated exemplar as described in the second example and the third example, to fetch the most similar items overall. Then, the system computes ranking features on whether an allocated items is globally the best item and other ranking-based scores . . . . Some or all of the most similar items may not be in the Retrieval Candidate set because, for example, a filter excludes them, or the system is displaying page #10 of results, and the best items are no longer eligible to be allocated. For example, the very best cat food result by the fourth example method costs $20. It is not in the retrieval candidate list. However, the second best is in the retrieval set, "chicken cat food brand A". In this case, the system 600 sets a feature on that item indicating that it is the second best item globally by the method of the fourth example.

The similarity scores from any one or more of the first through fourth examples may be fed by the system 600 into a click model to predict which item the user will select along with other features like average click rate and price. The click model predicts an optimal list order, and that list order is sent to the user.

Further operations and aspects of system 600 are described via Examples 57-80.

Example 57. A method for content searching and retrieval, comprising the operations of: receiving a search query for a search of items; generating one or more query embeddings based on the received search query; determining top-k similar queries with pre-existing exemplar embeddings; retrieving corresponding confabulated item embeddings; determining similarity of real items and confabulated items; and providing for display a user interface a listing of real product items based on similarity to the confabulated items.

Example 58. The method of Example 57, wherein the determining top-k similar queries comprises: comparing the query embeddings with pre-existing exemplar embeddings.

Example 59. The method of any one of Examples 57-58, further comprising the operations of: sending the one or more query embeddings in a feature pool for machine learning model inferencing.

Example 60. The method of any one of Example 57-59, further comprising the operations of: retrieving items from a vector database based on the one or more query embeddings.

Example 61. The method of any one of Examples 57-60, wherein a confabulated item is associated with a fake product.

Example 62. The method of any one of Examples 57-61, further comprising the operations of: fetching real items that are similar to the confabulated items by content embedding similarity determination using a vector database.

Example 63. The method of any one of Examples 57-62, further comprising the operations of: converting a confabulated example of a product to content embeddings for text embeddings and image embeddings and storing the content embeddings Example 64. The method of any one of Examples 57-63, further comprising generating a listing of confabulated product items by inputting the search query into a trained generative AI model.

Example 65. A system comprising one or more processors configured to perform the operations of: receiving a search query for a search of items; generating one or more query embeddings based on the received search query; determining top-k similar queries with pre-existing exemplar embeddings; retrieving corresponding confabulated item embeddings; determining similarity of real items and confabulated items; and providing for display a user interface a listing of real product items based on similarity to the confabulated items.

Example 66. The system of Example 65, wherein the determining top-k similar queries comprises: comparing the query embeddings with pre-existing exemplar embeddings.

Example 67. The system of any one of Examples 65-66, further comprising the operations of: sending the one or more query embeddings in a feature pool for machine learning model inferencing.

Example 68. The system of any one of Example 65-67, further comprising the operations of: retrieving items from a vector database based on the one or more query embeddings.

Example 69. The system of any one of Examples 65-68, wherein a confabulated item is associated with a fake product.

Example 70. The system of any one of Examples 65-69, further comprising the operations of: fetching real items that are similar to the confabulated items by content embedding similarity determination using a vector database.

Example 71. The system of any one of Examples 65-70, further comprising the operations of: converting a confabulated example of a product to content embeddings for text embeddings and image embeddings and storing the content embeddings Example 72. The method of any one of Examples 65-71, further comprising generating a listing of confabulated product items by inputting the search query into a trained generative AI model.

Example 73. Non-transitory computer storage that stores executable program instructions that, when executed by one or more computing devices, configure the one or more computing devices to perform operations comprising: receiving a search query for a search of items; generating one or more query embeddings based on the received search query; determining top-k similar queries with pre-existing exemplar embeddings; retrieving corresponding confabulated item embeddings; determining similarity of real items and confabulated items; and providing for display a user interface a listing of real product items based on similarity to the confabulated items.

Example 74. The non-transitory computer storage of Example 73, wherein the determining top-k similar queries comprises: comparing the query embeddings with pre-existing exemplar embeddings.

Example 75. The non-transitory computer storage of any one of Examples 73-74, further comprising the operations of: sending the one or more query embeddings in a feature pool for machine learning model inferencing.

Example 76. The non-transitory computer storage of any one of Example 73-75, further comprising the operations of: retrieving items from a vector database based on the one or more query embeddings.

Example 77. The non-transitory computer storage of any one of Examples 73-76, wherein a confabulated item is associated with a fake product.

Example 78. The non-transitory computer storage of any one of Examples 73-77, further comprising the operations of: fetching real items that are similar to the confabulated items by content embedding similarity determination using a vector database.

Example 79. The non-transitory computer storage of any one of Examples 73-78, further comprising the operations of: converting a confabulated example of a product to content embeddings for text embeddings and image embeddings and storing the content embeddings.

Example 80. The non-transitory computer storage of any one of Examples 73-79, further comprising generating a listing of confabulated product items by inputting the search query into a trained generative AI model.

Figure 8:
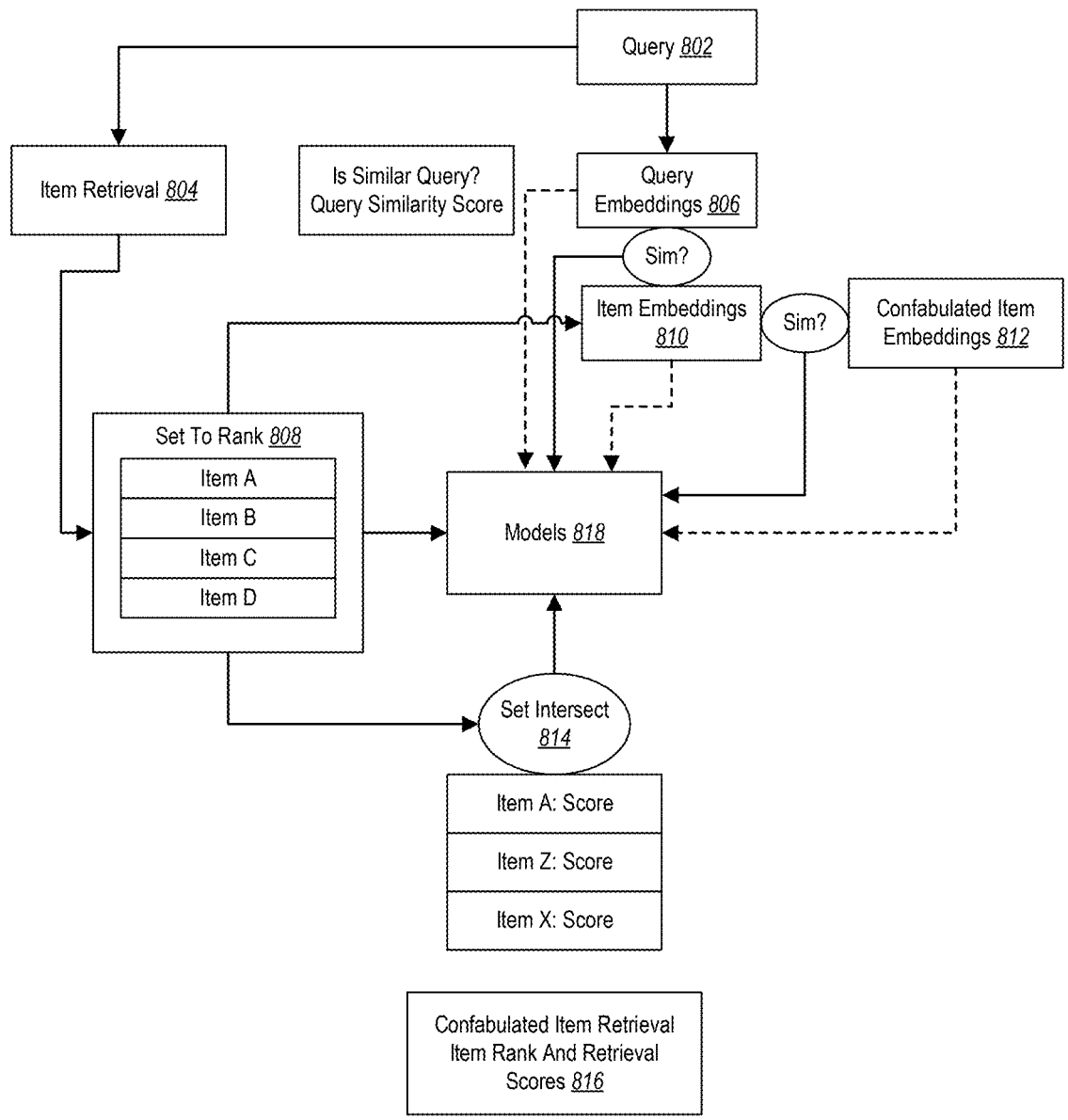
FIG. 8 is a diagram illustrating an exemplary method using an exemplary computer system.

FIG. 8 is a diagram illustrating an exemplary method using an exemplary computer system. FIG. 8 provides a simplified diagram describing a process 800 for confabulated item and real item search and retrieval. As described previous, a query 802 input by a user and may be augmented to add additional context or information for the query. Based on the query 802, the system performs and item retrieval process. Also, based on the query 802, the system performs a process to generate query embeddings 806. The system determines if item embeddings received from the ranking of times 808 are similar to item embeddings 810. The system determines if item embeddings 810 are similar to confabulated item embeddings 812. One or more machine learning models (such as a generative AI model and/or other types of machine learning models) may generate query embeddings, item embeddings and/or confabulated item embeddings. The system determines a set 814 of intersecting list of real items where the intersecting list comprises a list of real items based on items retrieved from traditional retrieval system, and a list of real items that are based on similarity to confabulated items. The list of real items may be ordered or ranked 816. A final listing of real product items are displayed via a user interface via a client device.

Figure 9:
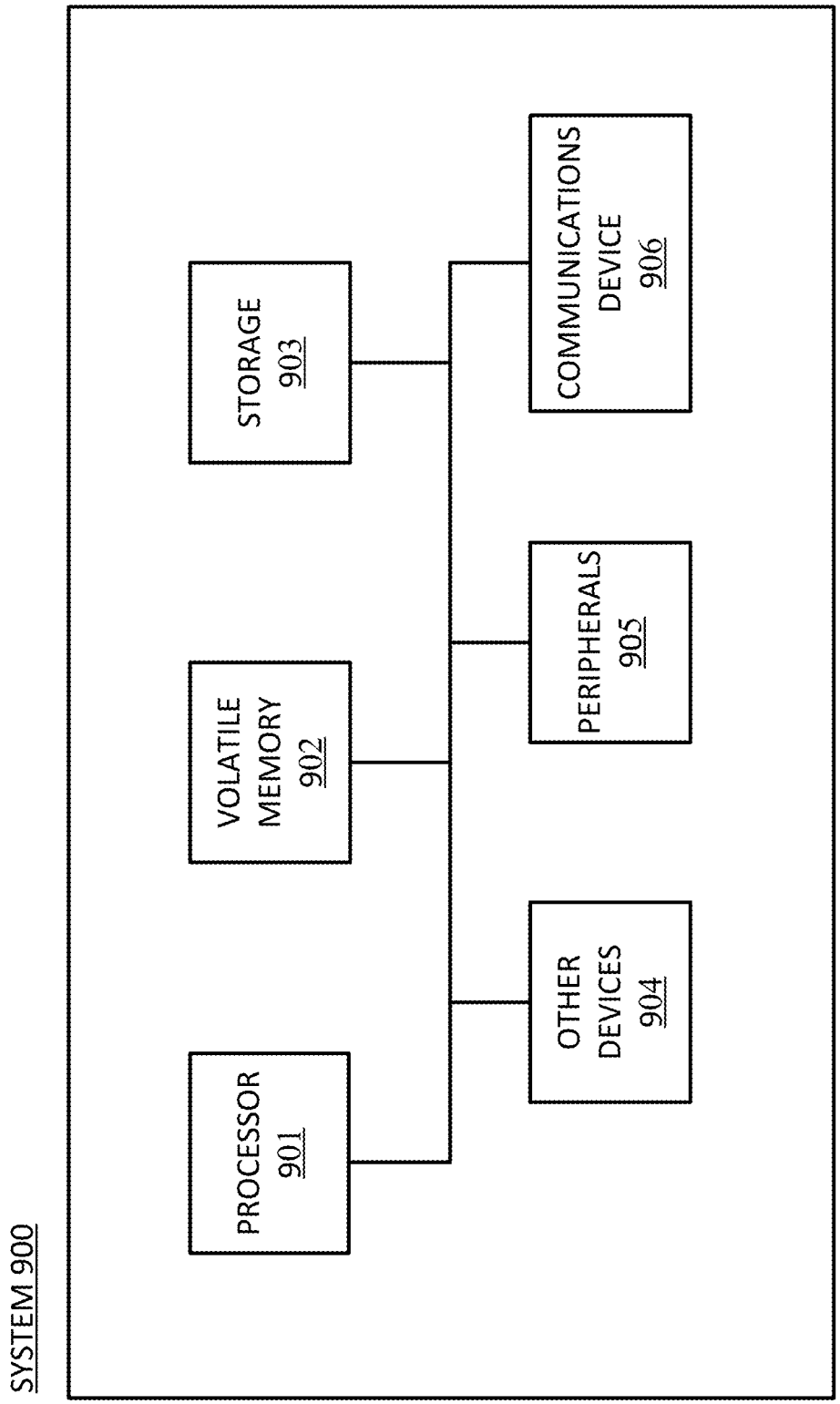
FIG. 9 is a diagram illustrating an exemplary computer that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 900 to an external medium. For example, communications device 906 may take the form of a network adapter that provides communications to a network. A computer 900 may also include a variety of other devices 904. The various components of the computer 900 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for content searching and retrieval performed by a processing engine hosted on a computer or multiple computers comprising operations of:
   receiving a search query for a search of real items, the search query received from an input from a client device;
   generating a first listing of items by utilizing the search query with a search module not based on generative artificial intelligence (AI);
   providing, for display within a graphical user interface of the client device, a first listing of items in response to the search query within a first response time;
   generating a second listing of items utilizing one or more generative AI models by:
      generating one or more query embeddings based on the received search query;
      determining a set of exemplar embeddings by utilizing a similarity between the generated one or more query embeddings and one or more exemplar embeddings from pre-existing search queries;
      identifying candidate real item embeddings from an embeddings vector database comprising real item embeddings of real items based on a comparison between the real item embeddings and the set of exemplar embeddings;
      generating, by one or more generative AI models with the search query, a set of confabulated item embeddings;
      determining a set of real item embeddings for the search query utilizing similarity scores between the candidate real item embeddings and the set of confabulated item embeddings; and
      generating the second listing of items by utilizing real items corresponding to the determined set of real item embeddings; and
   providing for display, within the graphical user interface of the client device, the second listing of items by populating the second listing of items with the displayed first listing of items within a second response time occurring after the first response time.

2. The method of claim 1, further comprising the operations of determining the set of real item embeddings by:

generating a similarity score from a comparison between a real item embedding and one or more confabulated item embeddings from the set of confabulated item embeddings; and selecting the real item embedding for the second listing of items based on the similarity score satisfying a similarity threshold value.

3. The method of claim 1, wherein the first listing of items comprises item textual descriptions and one or more images associated with the item.

4. The method of claim 1, wherein a real item from the real items comprises a digital content items.

5. The method of claim 1, further comprising the operations of:

generating, by the one or more generative Al models with the search query, a confabulated item representing the search query, wherein the confabulated item comprises artificial content; and generating a confabulated item embedding for the set of confabulated item embeddings from the confabulated item.

6. The method of claim 1, further comprising the operations of populating the second listing of items with the displayed first listing of items by merging the second listing of items within the displayed first listing of items.

7. The method of claim 1, further comprising the operations of introducing the one or more query embeddings in a feature pool for machine learning model inferencing.

8. The method of claim 1, further comprising the operations of providing for display, within the graphical user interface of the client device, the second listing of items comprising an item description.

9. A system comprising one or more processors configured to perform by a processing engine hosted on a computer or multiple computers, operations of:

receiving a search query for a search of real items, the search query received from an input from a client device;

generating a first listing of items by utilizing the search query with a search module not based on generative artificial intelligence (AI);

providing, for display within a graphical user interface of the client device, a first listing of items in response to the search query within a first response time;

generating a second listing of items utilizing one or more generative Al models by:

generating one or more query embeddings based on the received search query;

determining a set of exemplar embeddings by utilizing a similarity between the generated one or more query embeddings and one or more exemplar embeddings from pre-existing search queries;

identifying candidate real item embeddings from an embeddings vector database comprising real item embeddings of real items based on a comparison between the real item embeddings and the set of exemplar embeddings;

generating, by one or more generative Al models with the search query, a set of confabulated item embeddings;

determining a set of real item embeddings for the search query utilizing similarity scores between the set ofcandidate real item embeddings and the set of confabulated item embeddings; and generating the second listing of items by utilizing real items corresponding to the determined set of real item embeddings; and providing for display, within the graphical user interface of the client device, the second listing of items by populating the second listing of items with the displayed first listing of items within a second response time occurring after the first response time.

10. The system of claim 9, further comprising the operations of determining the set of real item embeddings by:

generating a similarity score from a comparison between a real item embedding and one or more confabulated item embeddings from the set of confabulated item embeddings; and selecting the real item embedding for the second listing of items based on the similarity score satisfying a similarity threshold value.

11. The system of claim 9,, wherein the first listing of items comprises item textual descriptions and one or more images associated with an item.

12. The system of claim 9, further comprising the operations of:

generating, by the one or more generative Al models with the search query, a confabulated item representing the search query, wherein the confabulated item comprises artificial content; and generating a confabulated item embedding for the set of confabulated item embeddings from the confabulated item.

13. The system of claim 9, further comprising the operations of providing for display, within the graphical user interface of the client device, the second listing of items comprising an item description.

14. Non-transitory computer storage that stores executable program instructions that, when executed by one or more computing devices, configure the one or more computing devices to perform operations comprising:

receiving a search query for a search of real items, the search query received from an input from a client device;

generating a first listing of items by utilizing the search query with a search module not based generative artificial intelligence (AI);

providing, for display within a graphical user interface of the client device, a first listing of item in response to the search query within a first response time;

generating a second listing of items utilizing one or more generative Al models by:

generating one or more query embeddings based on the received search query;

determining a set of exemplar embeddings by utilizing a similarity between the generated one or more query embeddings and one or more exemplar embeddings from pre-existing search queries;

identifying candidate real item embeddings from an embeddings vector database comprising real item embeddings of real items based on a comparison between the real item embeddings and the set of exemplar embeddings;

generating, by one or more generative AI models with the search query, a set of confabulated item embeddings;

determining a set of real item embeddings for the search query utilizing similarity scores between the candidate real item embeddings and the set of confabulated item embeddings; and generating the second listing of items by utilizing real items corresponding to the determined set of real item embeddings; and providing for display, within the graphical user interface of the client device, the second listing of items by populating the second listing of items with the displayed first listing of items within a second response time occurring after the first response time.

15. The non-transitory computer storage of claim 14, further comprising the operations of determining the set of real item embeddings by:

generating a similarity score from a comparison between a real item embedding and one or more confabulated item embeddings from the set of confabulated item embeddings; and selecting the real item embedding for the second listing of items based on the similarity score satisfying a similarity threshold value.

16. The non-transitory computer storage of claim 14, wherein the first listing of items comprises item textual descriptions and one or more images associated with an item.

17. The non-transitory computer storage of claim 14, further comprising the operations of:

generating, by the one or more generative AI models with the search query, a confabulated item representing the search query, wherein the confabulated item comprises artificial content; and generating a confabulated item embedding for the set of confabulated item embeddings from the confabulated item.

18. The non-transitory computer storage of claim 14, further comprising the operations of populating the second listing of items with the displayed first listing of items by merging the second listing of items within the displayed first listing of items.

19. The non-transitory computer storage of claim 14, further comprising the operations of providing for display, within the graphical user interface of the client device, the second listing of items comprising an item description.

20. The non-transitory computer storage of claim 14, further comprising the operations of providing for display, within the graphical user interface of the client device, the second listing of items comprising an item description and an image.

* * * * *